(12) United States Patent
Tsiberidis

(10) Patent No.: US 11,780,264 B2
(45) Date of Patent: *Oct. 10, 2023

(54) EMERGENCY WHEEL

(71) Applicant: GV ENGINEERING GMBH, Heimsheim (DE)

(72) Inventor: Konstantin Tsiberidis, Untergruppenbach (DE)

(73) Assignee: GV Engineering GmbH, Heimsheim (DE)

( * ) Notice: Subject to any disclaimer, the term of this patent is extended or adjusted under 35 U.S.C. 154(b) by 769 days.

This patent is subject to a terminal disclaimer.

(21) Appl. No.: 16/754,984

(22) PCT Filed: Oct. 8, 2018

(86) PCT No.: PCT/EP2018/077353
§ 371 (c)(1),
(2) Date: Apr. 9, 2020

(87) PCT Pub. No.: WO2019/072775
PCT Pub. Date: Apr. 18, 2019

(65) Prior Publication Data
US 2021/0039432 A1 Feb. 11, 2021

(30) Foreign Application Priority Data
Oct. 10, 2017 (DE) .......................... 102017123513.2

(51) Int. Cl.
*B60B 11/10* (2006.01)
*B60B 15/26* (2006.01)
*B60C 17/04* (2006.01)

(52) U.S. Cl.
CPC ............ *B60B 11/10* (2013.01); *B60B 15/263* (2013.01); *B60C 17/042* (2013.01); *B60C 17/043* (2013.01); *B60B 2310/305* (2013.01); *B60B 2310/306* (2013.01)

(58) Field of Classification Search
CPC ....... B60B 11/10; B60B 15/26; B60B 15/263; B60C 17/042; B60C 17/043
See application file for complete search history.

(56) References Cited

U.S. PATENT DOCUMENTS

| 2,454,923 | A | | 11/1948 | Howell, Jr. |
| 2,989,347 | A | | 6/1961 | Leopold |
| 3,679,267 | A | * | 7/1972 | Zachmann .............. B60B 11/10 301/38.1 |

(Continued)

FOREIGN PATENT DOCUMENTS

| EP | 2048003 B1 | 4/2009 |
| WO | 2006123044 A2 | 11/2006 |

OTHER PUBLICATIONS

PCT International Search Report and Written Opinion completed by the ISA/EP dated Jan. 16, 2019 and issued in connection with PCT/EP2018/077353.

(Continued)

*Primary Examiner* — Jason R Bellinger
(74) *Attorney, Agent, or Firm* — Barnes & Thornburg LLP

(57) ABSTRACT

An attachment is provided for a vehicle wheel for enabling a driving operation with restricted tire functions. An attachment system may include such an attachment and a wheel disc of the vehicle wheel.

18 Claims, 24 Drawing Sheets

(56) References Cited

U.S. PATENT DOCUMENTS

| | | | | |
|---|---|---|---|---|
| 3,770,323 | A * | 11/1973 | Isaacson | B60B 11/10 301/38.1 |
| 3,815,958 | A * | 6/1974 | Dietrich, Sr. | B60B 15/26 301/41.1 |
| 4,127,305 | A * | 11/1978 | Nielsen | B60B 11/06 403/14 |
| 4,666,216 | A | 5/1987 | Smith | |
| 5,087,103 | A * | 2/1992 | Pompier | B60B 11/10 301/39.1 |
| 5,407,255 | A * | 4/1995 | Feldman | B60C 27/14 301/38.1 |
| 6,068,346 | A | 5/2000 | Pender | |
| 6,217,125 | B1 | 4/2001 | Tubetto | |
| 7,731,299 | B2 * | 6/2010 | Thompkins | B60B 11/10 301/38.1 |
| 9,404,522 | B2 * | 8/2016 | Zhou | B60B 29/003 |
| 2020/0086683 | A1 * | 3/2020 | Tsiberidis | B60B 15/26 |
| 2020/0164682 | A1 * | 5/2020 | Tsiberidis | B60B 19/00 |
| 2020/0223250 | A1 * | 7/2020 | Tsiberidis | B60B 15/263 |
| 2021/0053391 | A1 * | 2/2021 | Tsiberidis | B60B 19/00 |
| 2022/0041011 | A1 * | 2/2022 | Tsiberidis | B60B 11/10 |
| 2022/0348038 | A1 * | 11/2022 | Tsiberidis | B60B 15/263 |

OTHER PUBLICATIONS

PCT International Preliminary Examination Report mailed by the ISA/EP dated Jan. 16, 2020 and issued in connection with PCT/EP2018/077353.

* cited by examiner

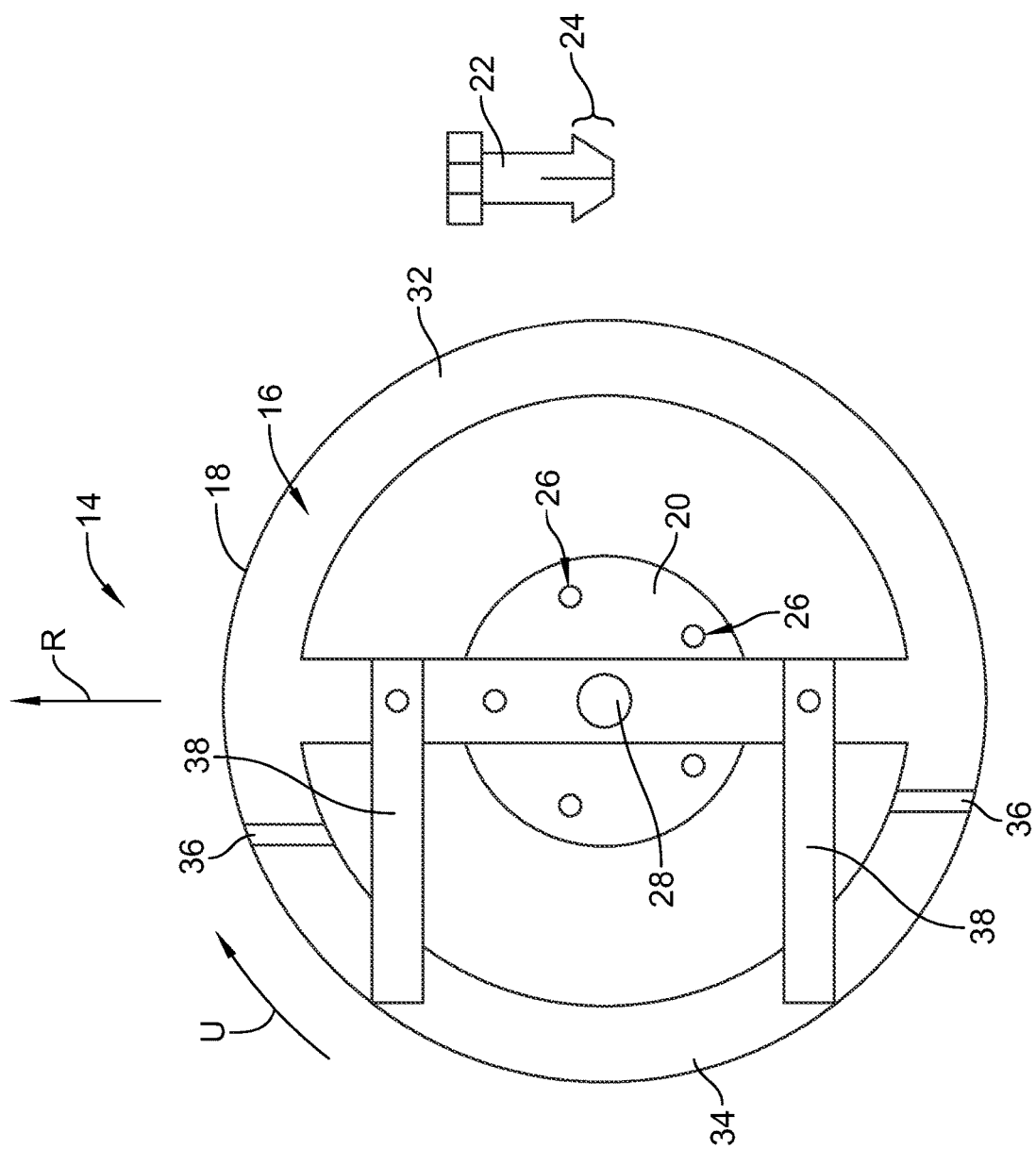

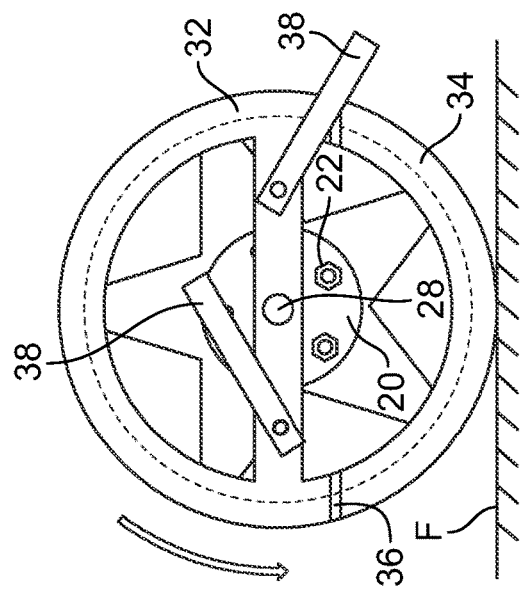
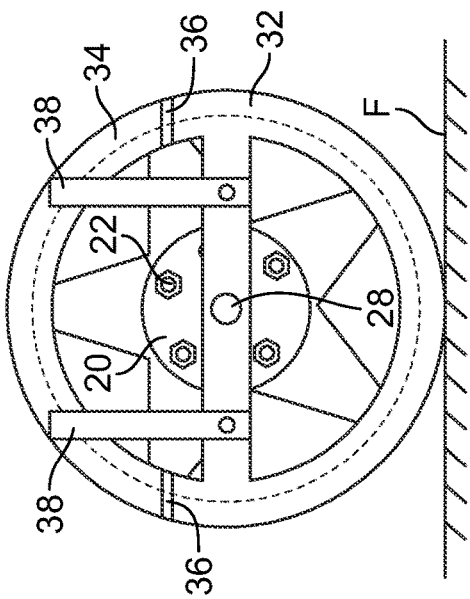
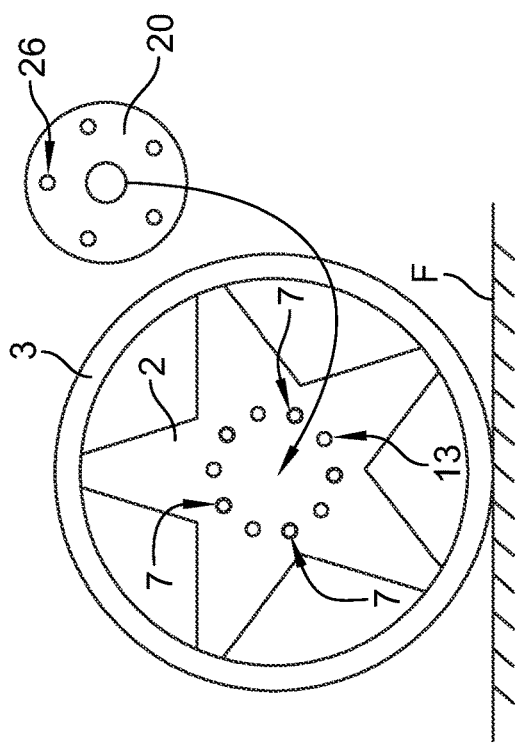

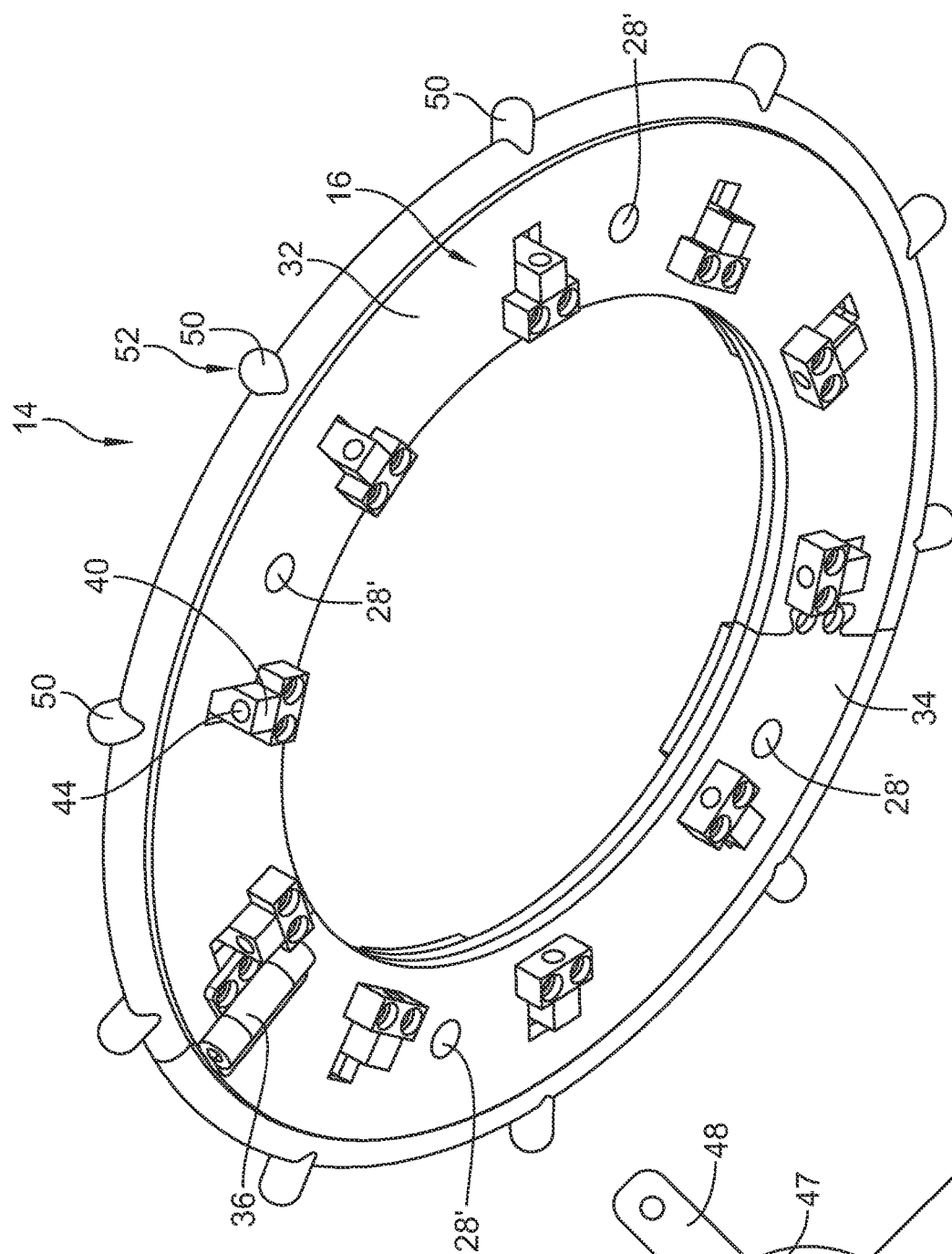
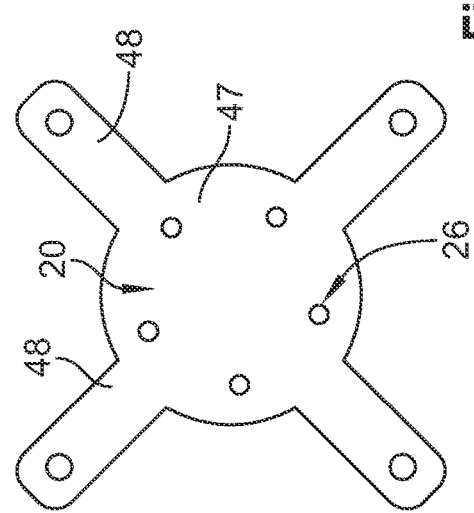
Fig. 6a
Fig. 6b

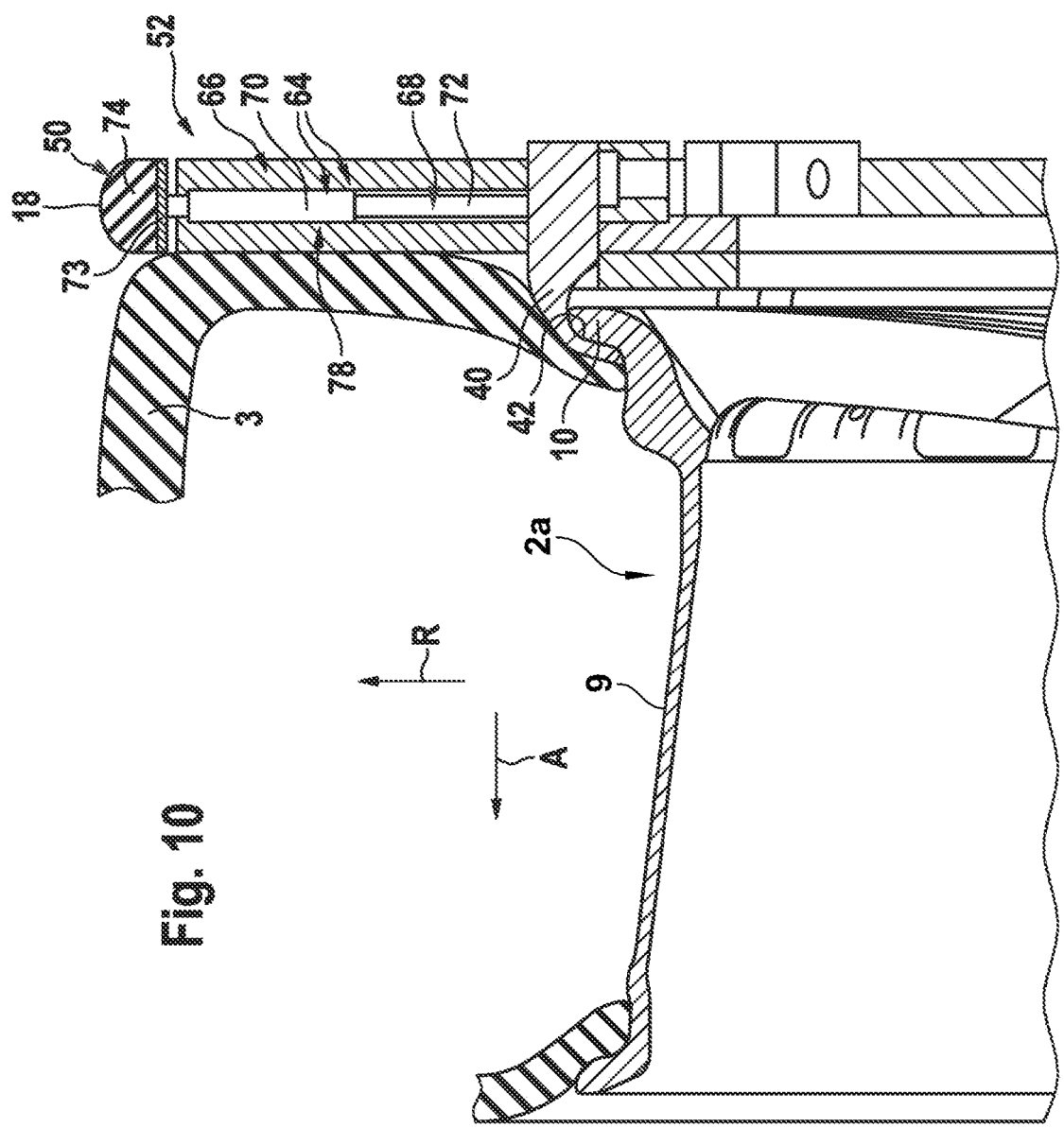

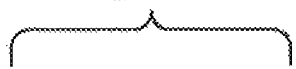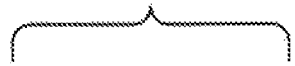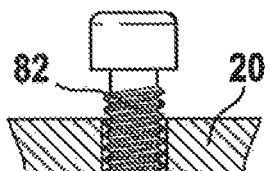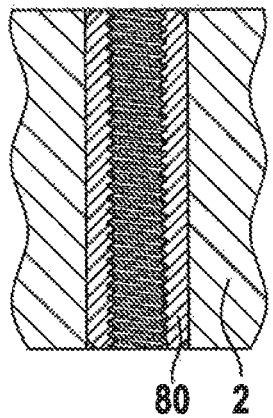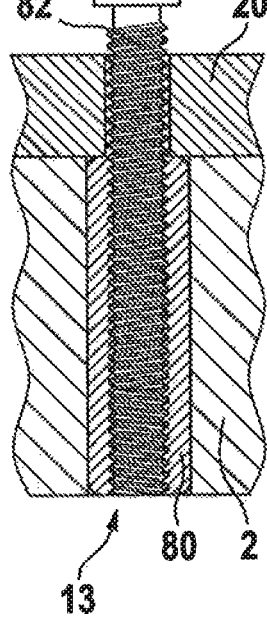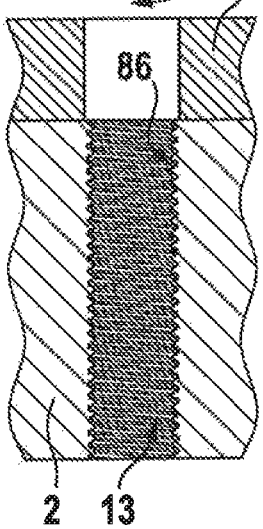

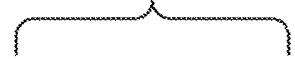
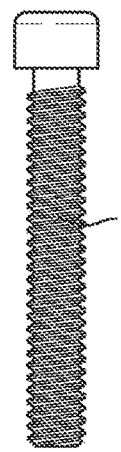
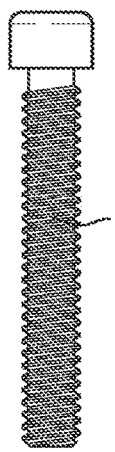
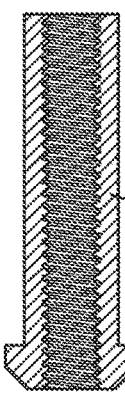
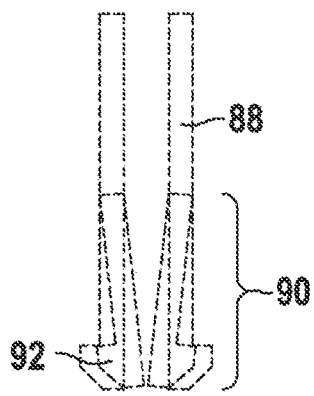
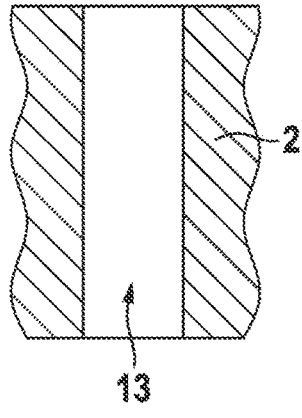
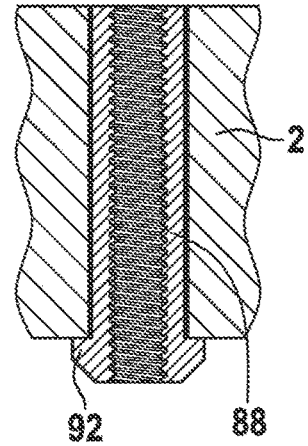
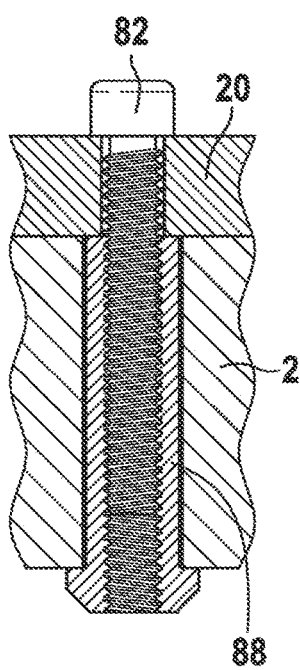

EMERGENCY WHEEL

CROSS-REFERENCE TO RELATED APPLICATIONS

This is a national stage entry of International Patent Application No. PCT/EP2018/077353, filed Oct. 8, 2018, which claims the benefit of and priority to German Patent Application No. 10 2017 123 513.2, filed Oct. 10, 2017, the disclosures of which are expressly incorporated herein by reference in their entireties.

FIELD OF THE DISCLOSURE

The present invention relates to an attachment for a vehicle wheel for enabling driving operation with reduced tire function.

The present invention relates additionally, independently thereof, to a system comprising an attachment and a rim of a vehicle wheel.

BACKGROUND

A vehicle wheel means a vehicle wheel of a motor vehicle. Driving operation with reduced tire function in the present case means driving operation in which the tire cannot be operated with the properties that it exhibits under usual road conditions and the usual tire condition. This can mean, for example, driving with a flat tire or also operation of the vehicle in icy or snowy conditions. The preferred field of application of the present invention is to enable driving with a flat tire.

In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. A bolt circle of the rim with a center opening of the vehicle wheel, for example, is located radially inwards, the bolt circle of the vehicle wheel meaning in the present case the arrangement of the holes in the rim which are provided for receiving wheel bolts, or stay bolts, including the center opening. The peripheral direction means the direction along the periphery of the vehicle wheel, that is to say along its tread surface.

SUMMARY

The object of the present invention is to provide an attachment for a vehicle wheel which can be mounted simply and securely, in particular the attachment is to prevent incorrect mounting. A further object is to provide a system comprising an attachment and a rim which in a simple and secure manner allows the attachment to be mounted on the rim.

This object is achieved by an attachment and a further object is achieved by a system. The attachment according to the invention is an attachment for a vehicle wheel for enabling driving operation with reduced tire function, having a tread portion which comprises a tread surface of the attachment, and having an initial mounting portion which, on mounting of the attachment, is arranged radially inwards from the tread surface, wherein the initial mounting portion is configured to be fastened to the vehicle wheel in the region of the bolt circle of the rim of the vehicle wheel, in particular to be fastened to the vehicle wheel in the region of the bolt circle of the rim via form-fitting engagement in the region of the bolt circle of the rim and/or via a connection, preferably a friction-based connection, in the region of the bolt circle of the rim.

With the attachment according to the invention it is thus possible to fasten the initial mounting portion in the region of the bolt circle of the rim. As will be explained in greater detail hereinbelow, the tread portion can be configured to be detachable from the initial mounting portion. In addition or alternatively to being detachable, the tread portion can also be displaceably and/or pivotably connected to the initial mounting portion.

On mounting, the attachment can in a first step be fastened to the rim of the vehicle wheel in the manner described above by means of the initial mounting portion. Optionally, the attachment, in particular the tread portion, can then additionally be fastened to the vehicle wheel, or the rim of the vehicle wheel, in a different way.

Optionally, the initial mounting portion is configured to be fastened via form-fitting engagement and/or friction-based engagement of a grip device with an opening, preferably a circular opening, in the rim, which opening is arranged in the region of the bolt circle, wherein the opening is arranged in the rim spaced apart from holes which are provided in the rim for receiving wheel bolts, or stay bolts, preferably wherein the opening is a center opening of the rim or is spaced apart from an axis of rotation of the rim. In any case, "arranged in the region of the bolt circle" also means that the opening is different from the gaps between the spokes of the rim. Such an opening can in particular be a so-called polycontrol bore.

The grip device, in particular if it is configured for engagement in the center opening of the rim, can be in the form of a slotted sleeve, for example. Inside the slotted sleeve there can be arranged an element having a varying radial extent, in particular a cone element, which is movable in the axial direction relative to the slotted sleeve. By the axial movement of the element, the slotted sleeve can be spread so that it engages in a friction-based manner in the center opening. The element can be movable in the axial direction relative to the spread sleeve via a screw, for example. Slotted sleeve can here also mean a plurality of spreadable arms.

Optionally, the grip device is configured as part of the initial mounting portion. In other words, it can be connected to the initial mounting portion in an undetachable manner.

The grip device can be in the form of a prolongation, in particular a rod-like prolongation, which can comprise a hook region, wherein the prolongation is configured to be inserted into the opening. The hook region can be configured to be extendable or spreadable, for example, so that, when it has been guided through the opening, it is able to engage behind the rim in a form-fitting manner.

The hook region can also be configured to be compressible. The hook region can then be reduced in its diameter as it is guided through the opening and can spread automatically when it has been guided through the openings, so that it can engage almost automatically behind the rims. For this purpose, the hook region can be configured, for example, to be reversibly compressible, resilient and/or spring-mounted.

In one embodiment, the grip device comprises an expandable portion which is configured to engage behind the opening in the region of the bolt circle. Such an expandable portion can be formed, for example, by a hook region which is configured to be spreadable. For example, the grip device can comprise two hook arms which move away from one another and can thus be spread, for example by the screwing in of a spreading element, for example a screw.

The grip device can in particular also be in the form of a hollow rod, wherein it can comprise on the inside a spreading element, in particular a flared rod, which widens the expandable portion by movement in an axial direction. Multiple grip devices are preferably arranged on the initial mounting portion. If the grip devices are, for example, in the form of hollow rods as just described, the flared rods or spreading elements which are optionally present can be connected together and, for example, can be movable jointly in the axial direction by an actuating unit, for example in the form of a screw, in order to widen the expandable portions.

An actuating part can be provided, for example, with slots having the shape of circular segments, which run on ramp-like elevations. By rotation of the actuating part, the spreading elements are moved into the grip devices by sliding along the ramp-like elevations, whereby the grip devices are spread. Rotation of the actuating part can be carried out manually, for example, via corresponding handles.

The actuating part can generally be configured to be able to bring about a movement of the spreading elements by a movement of the actuating part relative to the remainder of the initial mounting portion.

Optionally, the initial mounting portion is configured to be fastened to wheel bolts of the vehicle wheel via a clamping device, wherein the clamping device is configured to engage a wheel bolt in a clamping manner and to grasp it or to engage at least two, preferably all, of the wheel bolts jointly and to grasp them.

If the clamping device is configured to engage a wheel bolt in a clamping manner and grasp it, the clamping device can be configured to engage, for example via a sleeve of adjustable radius, a wheel bolt, or multiple wheel bolts each individually, and grasp them. The sleeve of adjustable radius is here merely an example of a form of the clamping device. The sleeve of adjustable radius can be placed onto the bolt head of a wheel bolt and the radius of the sleeve can then be reduced, whereby the wheel bolt is grasped. Such adjustability of the radius can be achieved, for example, by slots in the sleeve, wherein the individual parts of the sleeve spaced apart by slots can be moved or bent towards one another, they form, as it were, pivotable or bendable arms. If the clamping device is configured to engage a single wheel bolt in a clamping manner and grasp it, then it can also be configured to be inserted into an opening in the head of the wheel bolt and spread in that opening, so that it becomes jammed in the opening. One of the clamping devices just described, which engage a single wheel bolt and grasp it, can be provided for each wheel bolt.

If the clamping device is configured to engage at least two wheel bolts jointly in a clamping manner and grasp them, the clamping device can be configured to engage, for example via a sleeve of adjustable radius, multiple wheel bolts jointly and to grasp them. The sleeve of adjustable radius is here merely an example of a form of the clamping device. The sleeve of adjustable radius is typically so wide that it can be fitted over the bolt heads of all the wheel bolts and the radius of the sleeve can then be reduced, whereby the wheel bolts are grasped. The sleeve then clamps against the radially outer sides of the wheel bolts. The clamping device can also comprise a spreadable element which is arranged between the wheel bolts and is then spread in order to contact the wheel bolts from radially inwards and in this manner be jammed between the wheel bolts, or engage them, and grasp them. The clamping device can also comprise at least two fastening elements, but preferably one fastening element for each wheel bolt. The fastening element can be configured to be inserted into an opening in the head of the wheel bolt. It is also possible for the fastening element to be configured to be placed onto the head of a wheel bolt, wherein the portion of the fastening element that receives the bolt head can be configured to be complementary to the outer contour (usually a hexagon) of the head of the wheel bolt, or the portion of the fastening element that receives the bolt head has on its inner side longitudinal grooves for preventing rotation of the fastening element relative to the screw head. The clamping device can comprise a bending device which is configured to bend at least two fastening elements, preferably all the fastening elements, towards one another or away from one another when they are placed onto the head of the wheel bolt or inserted into the opening in the head of the wheel bolt. By this bending of the fastening elements towards one another or away from one another, the fastening elements are braced against one another. As a result, the clamping device engages the wheel bolts jointly in a clamping manner and grasps them in a clamping manner.

The bending device can be so configured that it is movable, for example by means of a screw, in the axial direction relative to the initial mounting portion and, on moving axially towards or away from the initial mounting portion, bends the fastening elements towards one another or away from one another. This can be achieved, for example, via a beveled surface on the bending device. It is also conceivable for the bending device to be in the form of a tension ring. It is conceivable that the bending device is biased via a spring towards the initial mounting portion or away from it and can be moved via a screw contrary to the biasing direction of the spring.

The bending device can also comprise a plate-shaped element having arcuate slots which deviate overall from a circular path. The bending device of this type can be so positioned with the slots that the fastening elements extend through the slots. Rotation of the bending device then leads, depending on the direction in which the slots deviate overall from the circular path, to the fastening elements bending away from one another or towards one another.

As already mentioned above, the tread portion is optionally configured to be detachable from the initial mounting portion. The initial mounting portion can then be fastened to the rim of the vehicle wheel, and the tread portion can subsequently be fastened to the initial mounting portion. It is thereby preferred if the tread portion has a connecting portion, which preferably extends over the region of the bolt circle when the tread portion is fastened to the initial mounting portion, which connecting portion is configured to overlap, when seen in the axial direction, the initial mounting portion so that the tread portion can be connected in a simple manner to the initial mounting portion, for example by screwing.

It is also conceivable for the tread portion to be connected to the mounting portion in such a manner that it is displaceable and/or pivotable in the axial direction. The initial mounting portion can then be fastened to the rim of the vehicle wheel, and the tread portion can subsequently be pushed and/or pivoted towards the rim. Preferably, it can then be fixed, or locked, relative to the mounting portion.

Optionally, the tread portion can be fastened, in particular in a detachable manner, or is fastened in an undetachable manner to the initial mounting portion via a fastening device, wherein the fastening device is so configured that the tread portion moves in an axial direction towards the rim on fastening to the initial mounting portion. For example, the fastening device can be in the form of a web-like strut and screws, wherein the strut is provided on the tread portion and, for example, has openings for receiving screws, which can be screwed into the initial mounting portion. The tread portion can thus be screwed to the initial mounting portion, wherein, on tightening of the screws, the tread portion moves towards the rim.

Optionally, the tread portion is connected or can be connected to the initial mounting portion in such a manner that it is movable in the axial direction relative to the initial mounting portion via an actuating device, preferably a pneumatic and/or spring-biased actuating device. Such movability is advantageous, in particular in combination with a contact portion on the tread portion that faces the rim, as will be explained hereinbelow. In particular, it is advantageous if the tread portion is movable towards the initial mounting portion by translation in the axial direction. For example, the actuating device can be in the form of a pressure cylinder to which a pressure medium can be applied in order to move the tread portion relative to the initial mounting portion.

Optionally, the tread portion is in multi-part form, in particular in a peripheral direction, preferably wherein the tread portion comprises at least two peripheral segments which in particular are detachable from one another and/or pivotable or displaceable relative to one another. Mounting of the attachment on the vehicle wheel can thereby be facilitated.

It is also within the meaning of the present invention if the tread portion comprises a first peripheral segment, preferably having a peripheral extent of more than 180°, in particular of more than 190°, and a second peripheral segment, wherein the second peripheral segment is detachably or pivotably or displaceably connected to the first peripheral segment. The attachment can thereby be attached to the vehicle wheel particularly easily. On mounting, the initial mounting portion, for example, can then be fastened to the vehicle wheel first. The tread portion, or a peripheral segment of the tread portion, can then be fastened to the initial mounting portion. If, for example, the two segments are pivotable relative to one another, then, on mounting, the second peripheral segment can initially remain pivoted on the first peripheral segment when the first peripheral segment is attached to the vehicle wheel, or to the initial mounting portion; the vehicle wheel can thus be moved so that the first peripheral segment comes into contact with its tread surface with the road surface. The second peripheral segment can then easily be pivoted upwards and locked, preferably via a locking mechanism, in the intended position for operation.

Optionally, the second peripheral segment can be aligned relative to the first peripheral segment via an alignment device, preferably an alignment device in pivotable form. This alignment device can form the above-mentioned locking device.

The peripheral extent of the first peripheral segment of more than 180° or more than 190° has the advantage that the first peripheral segment forms the major part of the attachment in the peripheral direction and can thus be attached stably and firmly to the vehicle wheel in a simple manner. In particular, the first peripheral segment can be arcuate in form and preferably comprise a strut extending in the manner of a chord. Particularly high stability and simple attachment of the attachment to the vehicle wheel are thereby achieved. Such an attachment having a first peripheral segment and a second peripheral segment can also comprise contact portions, which are arranged facing the rim.

Optionally, the tread portion can comprise an inner portion which is unbroken in the peripheral direction and is arranged radially inwards from an outer portion, wherein the outer portion is configured with a gap in the peripheral direction, and wherein the outer portion further comprises an insert portion which, when the attachment is in the mounted state on the vehicle wheel, is received in the gap in such a manner that the outer portion has a closed circular tread surface. Since the outer portion has the gap in the peripheral direction, it is possible to fit the initial mounting portion and the tread portion without the insert portion to the vehicle wheel without removing the vehicle wheel from the vehicle or lifting the vehicle with a car jack. For this purpose, the initial mounting portion can be fastened to the vehicle wheel, for example, in one of the ways described above. The gap in the outer portion of the tread portion is then oriented towards the ground and the tread portion is fastened to the initial mounting portion. When the initial mounting portion and the tread portion have been attached to the vehicle wheel, the vehicle can be moved slightly. The gap then moves, as a result of the vehicle wheel turning, away from the orientation towards the ground. For example, the vehicle can be moved forwards by half a turn of the vehicle wheel, the gap is then no longer oriented towards the road but points upwards. The insert portion can then be inserted, or received, into the gap. The attachment then has a closed circular tread surface in the peripheral direction. Mounting of the attachment may then be complete, or the attachment can be further fastened to the vehicle wheel via additional means (for example bracing means).

Optionally, the tread portion comprises at least one, preferably multiple, bracing means configured to engage with a hook portion behind a portion, in particular a rim flange, of the rim of the vehicle wheel. The tread portion can thereby be fastened particularly securely to the vehicle wheel.

Optionally, the attachment comprises a bracing mechanism having a contact portion which is configured to actuate the bracing means and bring the hook portion into engagement behind the portion of the rim, preferably the rim flange, when the contact portion is actuated, in particular subjected to pressure. Engagement behind the rim flange can thereby be brought about in a simple manner.

Optionally, the bracing mechanism is configured to contact the road surface with the contact portion when the attachment is attached to the vehicle wheel and the vehicle wheel is turning and thereby to actuate the contact portion, in particular subject it to pressure, preferably wherein the contact portion is arranged spatially, in particular when seen in the axial direction, in the tread surface of the attachment and preferably wherein the contact portion, in a deployed state, extends in the peripheral direction flush with the tread surface of the attachment. By turning the vehicle wheel with the attachment attached, actuation of the bracing means and thus engagement behind the rim flange are thereby ensured.

The contact portion can be connected to the bracing means via a pressure transmission device having a actuation device. The actuation device is configured to allow the contact portion to move without the bracing means moving further. It is thus prevented that, when the bracing means has been moved sufficiently, or has been moved into the intended position, the contact portion does not continue to exert pressure on the bracing means.

The pressure transmission means with or without the actuation device can also comprise a holding mechanism. The holding mechanism is so configured that it prevents the bracing means from moving out of engagement behind the portion of the rim, or the rim flange, when the contact portion is no longer subjected to pressure.

The bracing mechanism can be configured to contact the vehicle wheel, in particular the rim, or the initial mounting portion with the contact portion when the tread portion is fastened to the initial mounting portion and thereby to actuate the contact portion, in particular subject it to pressure, preferably wherein the contact portion is arranged on the side of the attachment that faces the rim.

Optionally, the hook portion of the bracing means, when seen in the axial direction, is configured to slope radially inwards, preferably in a linear or arcuate manner, wherein the bracing means is so configured that the hook portion moves, in particular is displaced, radially inwards when the bracing means is actuated and the bracing means moves towards the rim, in particular towards the rim flange, and the tread portion is urged in the axial direction towards the rim as a result of the movement of the hook portion. As a result, when the bracing means engages behind the rim flange, the tread portion is pulled towards the rim and particularly secure fastening of the tread portion is ensured.

Optionally, the attachment comprises a tire displacement device which is configured to displace the tire away from the rim flange in the axial direction on attachment of the attachment and/or on fastening of the tread portion to the initial mounting portion and/or on actuation of the bracing means. The bracing means thereby have free access to the rim flange.

Optionally, the tire displacement device is configured separately from the bracing means. It is also conceivable that the tire displacement device is formed by, or comprises, the bracing means, or a portion of the bracing means.

Optionally, the attachment comprises a bracing means locking device which can be moved into a securing position and is configured, in the securing position, to lock the bracing means, in particular by form-fitting locking, in such a manner that the hook portion cannot be moved out of engagement behind the portion of the rim of the vehicle wheel as long as the bracing means locking device is in the securing position.

Optionally, the bracing means locking device is so configured and arranged relative to the bracing means that the bracing means locking device, when it is moved into the securing position, additionally braces the hook portion of the bracing means, which is in engagement behind the portion of the rim, against the portion of the rim.

It is preferred if the bracing means locking device has a movable bracing surface which is configured and arranged to engage behind a portion, preferably a projection-like, in particular pin-like, portion, of the bracing means and subject it to pressure in such a manner that the hook portion of the bracing means is urged into the engaged position behind the portion of the rim of the vehicle wheel, or is braced in that engaged position, when the bracing means locking device is moved into the securing position.

Preferably, the bracing means locking device is coupled with an actuating portion in such a manner that the bracing means locking device is moved into the securing position when the actuating portion is actuated, in particular subjected to pressure.

Preferably, the actuating portion is arranged in the tread surface.

Preferably, the actuating portion has a contact surface which is made of a rubber material or comprises a rubber material. Preferably, the contact surface is arranged in the tread surface and so configured that, on contact with the road surface, it wears in such a manner that it extends flush with the road.

The bracing means, the bracing mechanism and the bracing means locking device have been described above in various forms. These forms relate to the embodiments of the attachment according to the invention described hereinbefore.

An independent invention is also an attachment which has a base body with a tread surface, wherein the attachment additionally comprises one or more embodiments of the bracing means described hereinbefore, in particular and one or more embodiments of the bracing mechanism, preferably and one or more embodiments of the bracing means locking device. Such an attachment thus does not necessarily have to comprise the tread portion and the initial mounting portion of the embodiments described hereinbefore. In particular, an independent invention is an attachment which has a base body with a tread surface, wherein the attachment comprises one, preferably multiple, bracing means configured to engage with a hook portion behind a portion, in particular a rim flange, of the rim of the vehicle wheel, preferably wherein the attachment comprises a bracing mechanism having a contact portion which is configured to actuate the bracing means and bring the hook portion into engagement behind the portion of the rim, preferably the rim flange, when the contact portion is actuated, in particular subjected to pressure, preferably wherein the bracing mechanism is configured to contact the vehicle wheel, in particular the rim, or the initial mounting portion with the contact portion when the tread portion is fastened to the initial mounting portion and thereby actuate the contact portion, in particular subject it to pressure, preferably wherein the contact portion is arranged on the side of the attachment that faces the rim, preferably wherein the hook portion of the bracing means, when seen in the axial direction, is configured to slope radially inwards, preferably in a linear or arcuate manner, wherein the bracing means is so configured that the hook portion moves, in particular is displaced, radially inwards when the bracing means is actuated and the bracing means moves towards the rim, in particular towards the rim flange, and that, by the movement of the hook portion, the attachment is urged in the axial direction towards the rim, preferably wherein the attachment comprises a bracing means locking device which is movable into a securing position, in particular manually and/or via an actuating portion which is preferably configured and arranged to contact the road when the attachment is in the mounted state, and is configured, in the securing position, to lock the bracing means in such a manner, in particular by form-fitting locking, that the hook portion cannot be moved out of engagement behind the portion of the rim of the vehicle wheel as long as the bracing means locking device is in the securing position, preferably wherein the bracing means locking device is so configured and arranged relative to the bracing means that the bracing means locking device, when it is moved into the securing position, additionally braces the hook portion of the bracing means, which is in engagement behind the portion of the rim, against the portion of the rim. Such an attachment can be fastened particularly securely to the vehicle wheel.

Also within the meaning of the invention is a system comprising an attachment and a rim of a vehicle wheel, wherein the attachment is configured according to one or more of the preceding embodiments and the rim has at least one opening, preferably multiple openings, which is or are arranged in the rim in the region of the bolt circle, and wherein the opening (or openings) is or are arranged spaced apart from the holes which are provided for receiving wheel bolts, or stay bolts, preferably and from the center openings of the rim. The opening or openings is/are different from the gaps between the spokes of the rim. Preferably, the openings are so-called polycontrol bores.

Optionally, in the system, mid-points of the openings are arranged spaced apart, preferably radially outwardly spaced apart, from a circle which extends through mid-points of the holes provided for receiving wheel bolts, or stay bolts, and/or the mid-points of the openings are arranged spaced apart, preferably radially inwardly spaced apart, from a circle which forms the smallest circle which circumscribes all the holes provided for receiving wheel bolts, or stay bolts.

In the embodiments described hereinbefore, the attachment, in particular the tread portion, can comprise a tire gripping device which is configured to bite into the tires of the vehicle and to clamp or penetrate the tire material. The tire can thereby be fastened to the attachment, in particular to the tread portion, and secured against falling off while driving.

An independent invention is also an attachment for a vehicle wheel for enabling driving operation with reduced tire function, having a tread portion which comprises a tread surface of the attachment, wherein the attachment comprises at least one tire gripping device which is configured to bite into the tire of the vehicle wheel and to clamp or penetrate the tire material. Preferably, the tire gripping device has for this purpose tooth-like projections which are configured to penetrate the material of the tire.

The attachment can thereby be fastened directly to the tire of the vehicle wheel.

An independent invention is also that an annular element is provided which is first fastened to the tire via the tire gripping device, wherein the annular element preferably has a smaller diameter than the tire. A tread portion can then be arranged on the annular element as described at the beginning. In a separate invention, the annular element fastened via the tire gripping device can thus form a replacement for the initial mounting portion.

It is also conceivable that suction elements or adhesive elements are used in addition or alternatively to the tire gripping device. Also conceivable is the use of chemical fastening elements which are so configured that they form a material-bonded connection with the tire via a chemical reaction with the material of the tire.

Such means can serve in the above-described variants to additionally fasten the attachment and/or to secure the tire against falling off while driving.

An independent invention is also that an annular element is provided which is first fastened to the tire via the suction elements, chemical fastening elements and/or adhesive elements, wherein the annular element preferably has a smaller diameter than the tire. A tread portion can then be arranged on the annular element as described at the beginning. In a separate invention, the annular element fastened via the tire gripping device can thus form a replacement for the initial mounting portion.

BRIEF DESCRIPTION OF THE DRAWINGS

Further features, possible applications and advantages of the invention will become apparent from the following description of exemplary embodiments of the invention, which are explained with reference to the drawing, wherein the features can be fundamental to the invention both on their own and in different combinations, without explicit reference again being made thereto. In the drawing:

FIG. 3 shows a first embodiment of an attachment according to the invention;

FIG. 4 includes FIGS. 4a to 4d, and shows a mounting of the attachment of FIG. 3;

FIG. 6 includes FIGS. 6a and 6b, and shows a further embodiment of an attachment according to the invention in a perspective representation;

FIG. 10 shows a bracing mechanism;

FIG. 11 includes FIGS. 11a to 11c, and shows a fastening of an initial mounting portion by means of a grip device;

FIG. 12 includes FIGS. 12a to 12c, and shows a further alternative of a fastening of an initial mounting portion by means of a grip device;

DETAILED DESCRIPTION

In the following figures, corresponding components and elements bear the same reference signs. For the sake of better clarity, not all reference signs are reproduced in all the figures.

Figure 1:
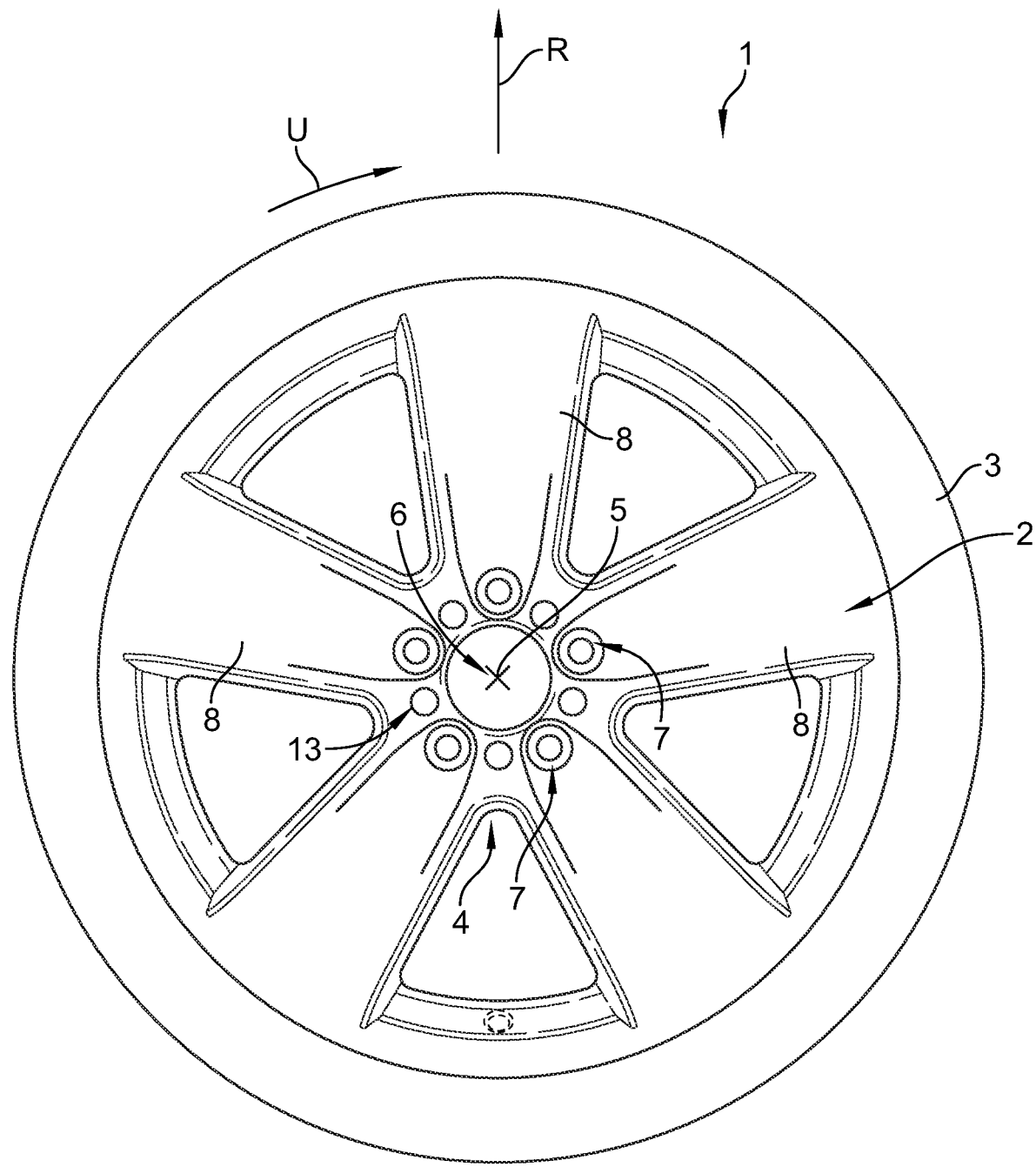
FIG. 1 shows a vehicle wheel, looking in an axial direction.

FIG. 1 shows, in schematic representation, a vehicle wheel 1. The vehicle wheel 1 comprises a wheel disc 2 and a tire 3 attached to a rim 2a of the wheel 1. The wheel 1 is shown on its own in FIG. 2 without the tire 3.

Figure 2:
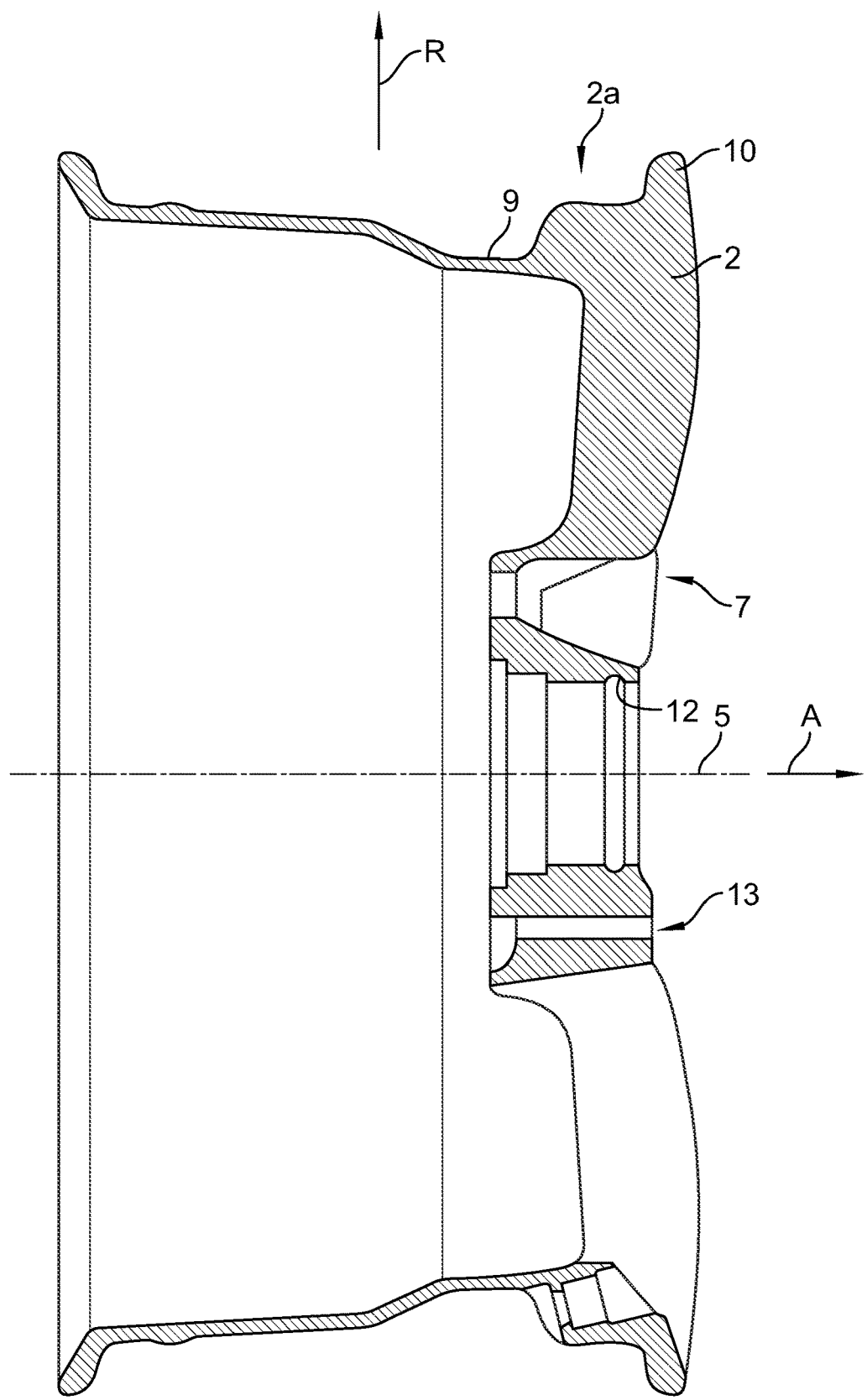
FIG. 2 is a sectional representation of the wheel disc and the rim of the vehicle wheel of FIG. 1.

A peripheral direction is represented by an arrow having the reference sign U. An axial direction is represented by an arrow having the reference sign A (FIG. 2). A radial direction is represented by an arrow having the reference sign R.

Radially on the inside, the wheel disc 2 comprises a bolt circle 4 of the vehicle wheel 1. In the center of the bolt circle 4 there is arranged a so-called center opening 6, about an axis of rotation 5 of the vehicle wheel 1 extending in the axial direction A, which is sometimes also referred to as a hub borehole or center hole centering. In the present case, the bolt circle 4 comprises five bolt holes 7, two of which are provided with a reference numeral. In the present vehicle wheel 1, five spokes 8 extend radially outwards from the region of the bolt circle 4.

The rim 2a comprises a rim well 9 and a rim flange 10, which together make up the rim 2a to which the tire 3 is attached, and the center opening 6 has a recessed peripheral groove 12.

The wheel disc 2 has multiple openings 13, which are arranged in the region of the bolt circle 4. The openings 13 are arranged in the wheel disc 2 spaced apart from the bolt holes 7, that is to say holes 7, which are provided for receiving wheel bolts or stay bolts, and from the center openings 6 of the wheel disc 2. The openings 13 can be in the form of polycontrol bores, for example, via which an axle clearance of the axle of the vehicle wheel 1 can be measured.

If the tire 3 of the vehicle wheel has a puncture, the air in the tire escapes and the tire function of the vehicle wheel 1 is reduced. In order to enable driving operation to continue in such a case, an attachment 14 according to the invention can be used.

An example of such an attachment is shown in FIG. 3. The attachment 14 is formed with a tread portion 16, which comprises a tread surface 18 of the attachment 14, and with an initial mounting portion 20, which is arranged radially inwards from the tread surface 18 on mounting of the attachment 14.

In the present case, the tread portion 16 is configured to be detachable from the initial mounting portion 20.

The initial mounting portion 20 is configured to be fastened to the vehicle wheel 1 in the region of a bolt circle 4 of a wheel disc 2 of the vehicle wheel 1, in particular to be fastened via form-fitting engagement and/or a connection, in particular a friction-based connection, in the region of the bolt circle 4 of the wheel disc 2.

In the present example, the form-fitting engagement is achieved by means of one or multiple grip devices 22. In the present example, the grip device 22 comprises an expandable portion 24. In the present example, the grip device 22 is in bolt-like form and can be inserted into fastening holes 26 of the initial mounting portion 20. The expandable portion 24 can be spread after the grip device 22 has been inserted.

The tread portion 16 can be fastened to the initial mounting portion 20 via a fastening device 28. In the present case, the fastening device 28 is in the form of a central screwing device. The fastening device 28 is so configured that the tread portion 16, on fastening to the initial mounting portion 20, moves in the axial direction A towards the initial mounting portion 20 and thus towards the wheel disc 2 when the initial mounting portion 20 is already attached to the wheel disc 2.

In the present case, the tread portion 16 is in multi-part form in the peripheral direction U, preferably wherein the tread portion 16 comprises a first peripheral segment 32 and a second peripheral segment 34. The second peripheral segment 34 is detachably and pivotably connected to the first peripheral segment 32 via detachable hinge devices 36. The hinge devices 36 can also be in undetachable form.

The second peripheral segment 34 can be aligned relative to the first peripheral segment via two alignment devices 38, which in the present case are in pivotable form.

The phrase "can be aligned" means that the second peripheral segment 34 can be urged via the alignment devices 38 into an intended position relative to the first peripheral segment 32, and can be held in that position via the alignment devices 38.

The alignment devices 38 can also be in the form of a locking mechanism, with which the position of the second peripheral segment 34 relative to the first peripheral segment 32 can be locked.

For fastening the initial mounting portion 20, the fastening holes 26 are positioned over the openings 13 of the wheel disc 2 (FIG. 4a). The grip devices 22 are then inserted into the fastening holes 26 and pushed into the openings 13 of the wheel disc 2. When the fastening devices 22 have been pushed fully through the openings 13, the expandable portion 24 is spread, thus engaging behind the openings 13 in the wheel disc 2 (FIG. 4b).

When the initial mounting portion 20 has been fastened to the vehicle wheel (FIG. 4b), the tread portion 16 is fastened to the initial mounting portion 20 in a next step (FIG. 4c). For this purpose, the tread portion 16 in the present embodiment is fastened to the initial mounting portion 20 via the fastening device 28. During this fastening operation, the tread portion 16 moves in the axial direction A towards the vehicle wheel 1.

On fastening of the tread portion 16 to the initial mounting portion 20, the first peripheral segment 32 is first fastened to the initial mounting portion 20 via the fastening device 28. The second peripheral segment 34 has thereby not yet been aligned relative to the first peripheral segment 32 by means of the alignment devices 38. The second peripheral segment 34 is thus still pivotable relative to the first peripheral segment 32. It is thus possible in a simple manner to fasten the first peripheral segment 32 to the initial mounting portion 20.

Once the first peripheral segment 32 is connected to the initial mounting portion 20, the vehicle wheel 1 can be moved by half a turn so that the second peripheral segment 34 is no longer oriented towards the road surface F but is oriented upwards. Via the alignment devices 38, the second peripheral segment 34 can then be aligned relative to the first peripheral segment 32 and optionally locked (FIG. 4d).

The fastening operation may then be complete. However, it is also within the meaning of the invention if the tread portion 16 is additionally fastened to the vehicle wheel 1 (for example via bracing means described hereinbelow). This will be discussed in greater detail below.

Figure 5:
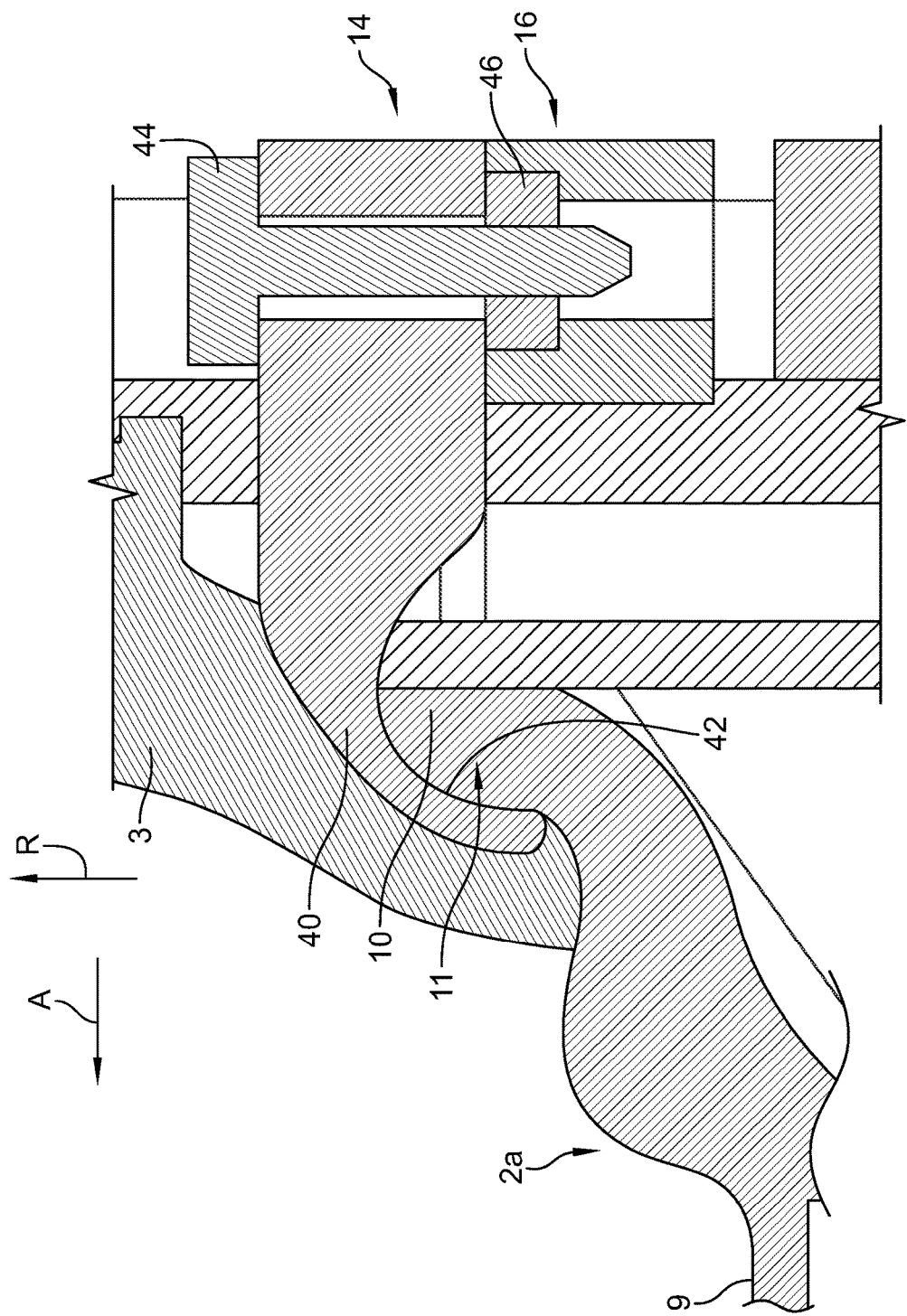
FIG. 5 shows a bracing means.

The tread portion 16 can comprise bracing means 40 which are configured to engage with a hook portion 42 behind a portion 11, in the present case the rim flange 10, of the rim 2a of the vehicle wheel 1. Such engagement of a bracing means 40 behind the rim flange 10 is illustrated in FIG. 5.

The bracing means 40 can be configured, for example, to be radially displaceable or also pivotable. Preferably, the bracing means 40 can be actuated in such a manner that, on actuation, they engage behind the portion 11, in particular the rim flange 10, of the rim 2a. In FIG. 5, the bracing means 40 can be actuated via an actuating screw 44. The actuating screw 44 engages into a counter-member 46 and, when the actuating screw 44 is tightened, the bracing means 40 is moved in the radial direction towards the rim flange 10, until it is in the engaged position shown in FIG. 5.

Preferably, the hook portion 42 of the bracing means 40, when seen in the axial direction A, is configured to slope radially inwards, preferably in a linear or arcuate manner (shown in FIG. 5), wherein the bracing means 40 is so configured that the hook portion 42 moves, in particular is displaced, radially inwards when the bracing means 40 is actuated and the bracing means 40 moves towards the wheel disc 2, in particular towards the rim flange 10, and that, as a result of the movement of the hook portion 42, the tread portion 16 is urged in the axial direction A towards the wheel disc 2.

FIG. 6 shows a further embodiment according to the invention of an attachment 14. In this embodiment, the tread portion 16 is annular in shape. The initial mounting portion 20, on the other hand, has a portion 47 having the shape of a circular disk and arms 48 protruding therefrom. The tread portion 16 can be fastened to the arms 48 via corresponding fastening devices 28'. In the embodiment of FIG. 6, the tread portion 16 has only a single hinge device 36 and, opposite thereto on the second peripheral segment 34, a dovetail-like engagement structure.

In the embodiment of FIG. 6, the tread portion 16 has multiple contact portions 50. The contact portions 50 are each part of a bracing mechanism 52. The contact portions 50 are configured to actuate the bracing means 40 associated therewith and to bring the hook portion 42 into engagement behind the portion 11 of the rim 2a, preferably the rim flange 10, when the contact portion 50 is actuated, in particular subjected to pressure.

The bracing mechanism 52 of FIG. 6 is configured to contact the road surface F with the contact portion 50 when the attachment 14 is attached to the vehicle wheel 1 and the vehicle wheel 1 is turning and thereby actuate the contact portion 50, in particular subject it to pressure. Preferably, the contact portion 50 is arranged spatially, in particular when seen in the axial direction, in the tread surface 18 of the attachment 14, as illustrated in FIG. 6.

Figure 7:
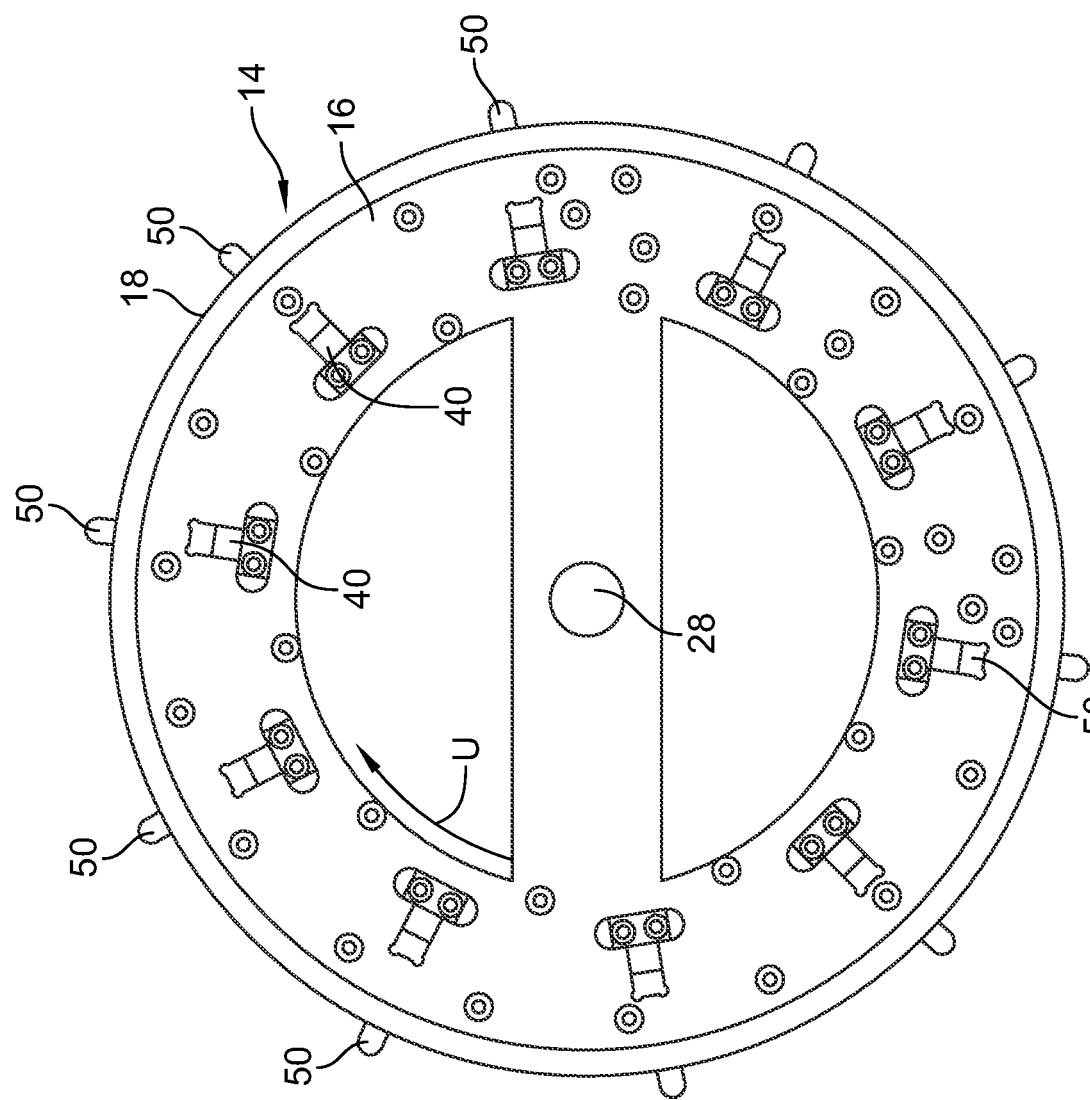
FIG. 7 shows a further embodiment of an attachment according to the invention.

FIG. 7 shows a further embodiment of a tread portion 16, which is in one-piece form and can be combined, for example, with the initial mounting portion 20 of FIGS. 3 and 4.

Figure 8B:
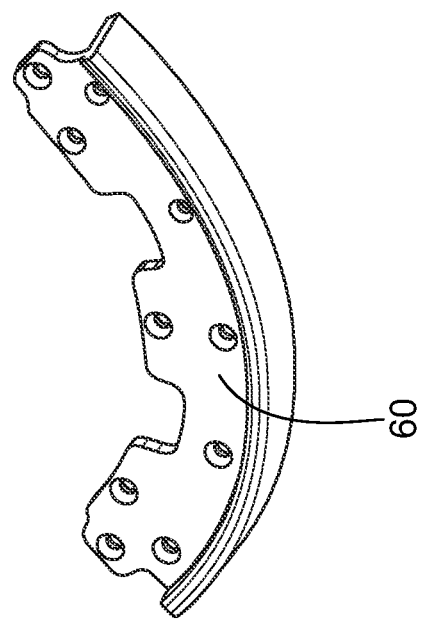
FIG. 8 includes FIGS. 8a and 8b, and shows a further embodiment of an attachment according to the invention.
Figure 8A:
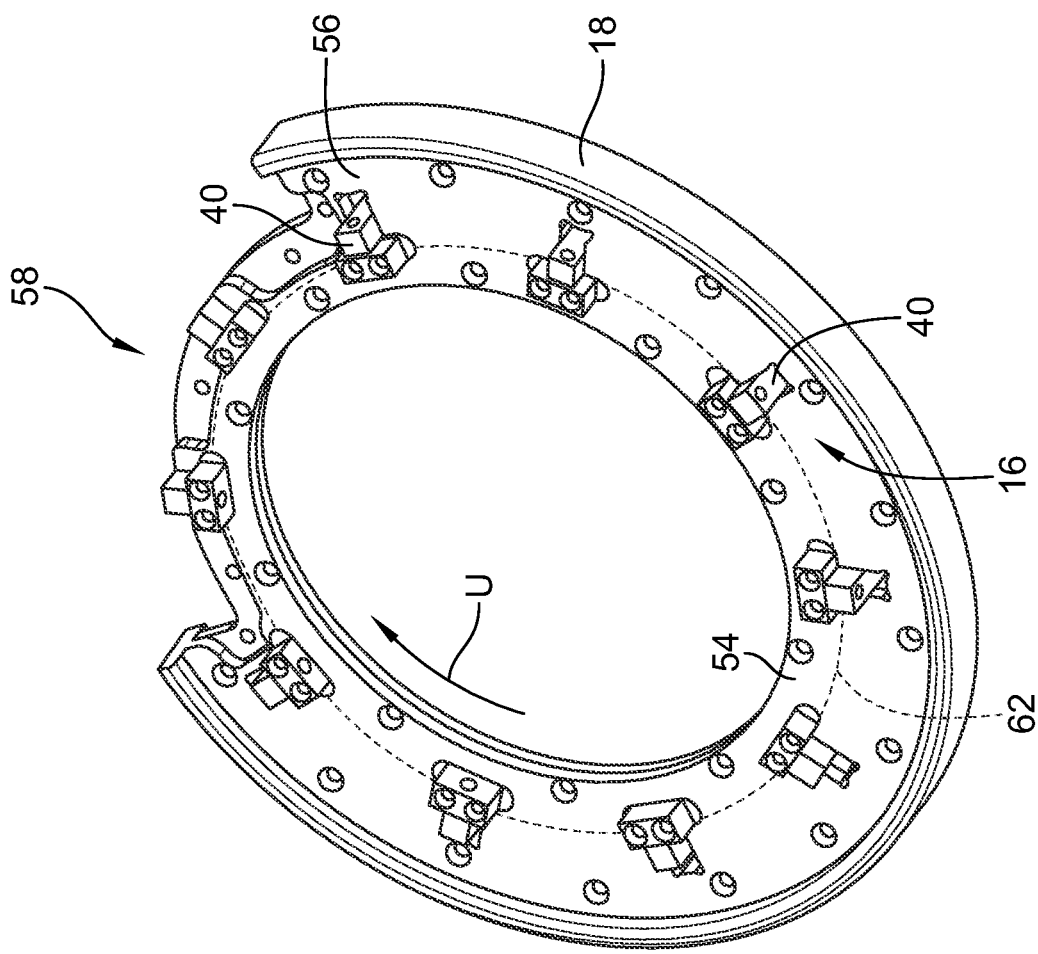

FIGS. 8 and 9 show a further embodiment of a tread portion 16 which can be combined, for example, with the initial mounting portion 20 of FIGS. 3 and 4.

The tread portion 16 of FIGS. 8 and 9 comprises an inner portion 54 which is unbroken in the peripheral direction U and is arranged radially inwards from an outer portion 56, wherein the outer portion 56 is configured with a gap 58 in the peripheral direction, and wherein the outer portion 56 further comprises an insert portion 60 which, when the attachment 14 is in the mounted state on the vehicle wheel 1, is received in the gap 58 in such a manner that the outer portion 56 has a closed circular tread surface 18 (FIG. 9).

FIG. 8 shows the insert portion 60 in the state detached from the outer portion 56, and FIG. 9 shows it in a state in which it is inserted in the gap 58.

For mounting the tread portion 16 on the initial mounting portion 20, the gap 58 can first be oriented towards the road surface F. The vehicle wheel 1 can thereby remain in contact with the road surface F during mounting. The vehicle wheel 1 can then be moved so that the gap 58 points away from the road surface F. The insert portion 60 can then be inserted into the gap 58.

The embodiment of FIGS. 8 and 9 also comprises a coupling mechanism 62 which couples together the actuation or movement of all the bracing means 40. Such a coupling mechanism 62 can be provided in all the embodiments of the bracing means 40. For example, the coupling mechanism 62 can be in the form of a cable-pull device, by means of which all the bracing means 40 can be uniformly and evenly moved radially inwards.

Figure 9B:
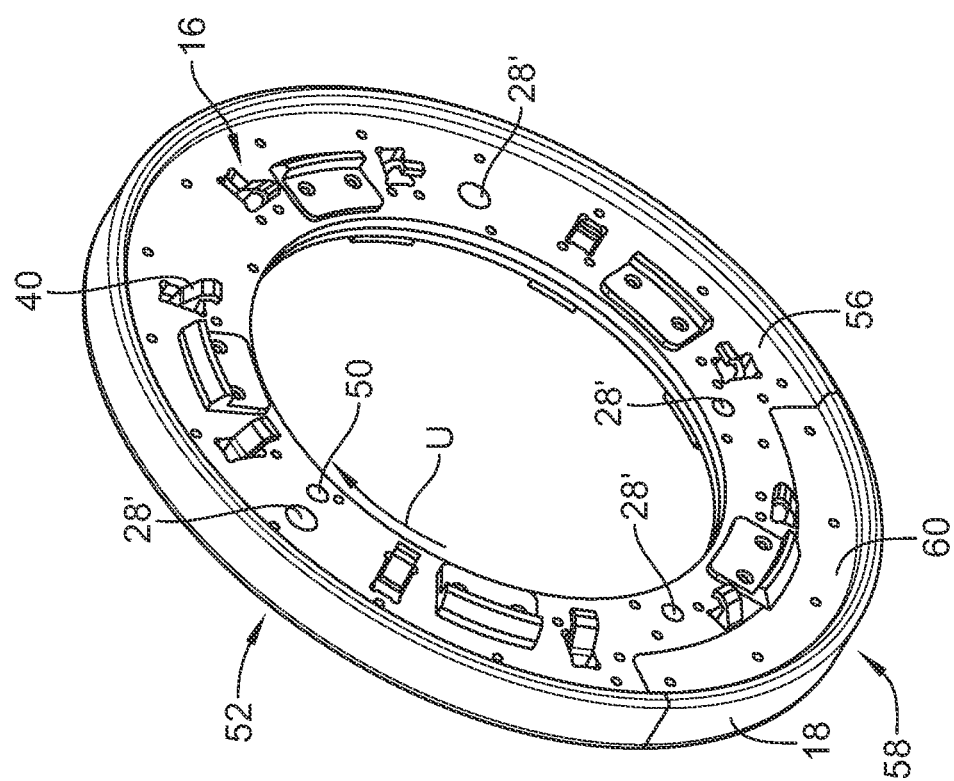
FIG. 9 includes FIGS. 9a and 9b, and shows the attachment of FIG. 8 in an assembled configuration.
Figure 9A:
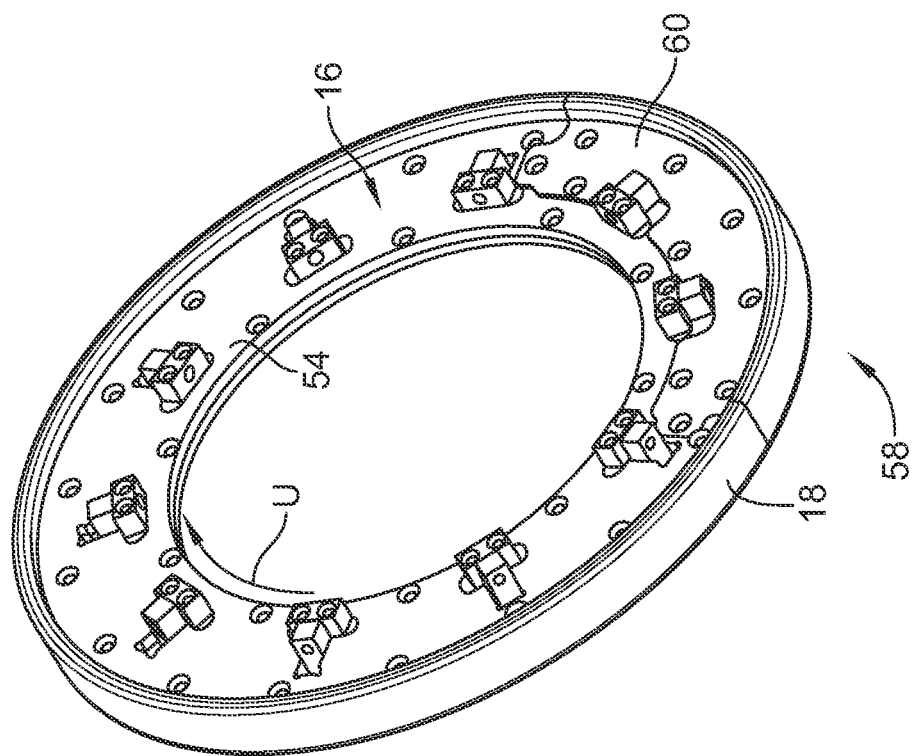

In FIG. 8 and in the representation on the left in FIG. 9a, the tread portion 16 is shown looking at the side that is remote from the vehicle wheel 1. In the representation on the right in FIG. 9b, the tread portion 16 is shown looking at the side that faces the vehicle wheel 1 (in each case based on the mounted state of the tread portion 16 on the vehicle wheel 1).

The tread portion 16 of FIGS. 8 and 9 comprises, as is shown in the representation on the right in FIG. 9b, a bracing mechanism 52 which is configured to contact the initial mounting portion 20 with the contact portion 50 when the tread portion 16 is fastened to the initial mounting portion 20 and thereby to actuate the contact portion 50, in particular subject it to pressure. For this purpose, the contact portion 50 is arranged on the side of the attachment 14 that faces the wheel disc 2, as shown on the right in FIG. 9b.

FIG. 10 shows the coupling of a contact portion 50, which is arranged as in FIG. 6 or 7, with a bracing means 40.

The contact portion 50 can be connected to the bracing means 40 via a pressure transmission device 64 having a actuation device 66. The actuation device 66 can include a pressure cylinder 68 having a first cylinder part 70 and a second cylinder part 72. The bracing means 40 can be coupled mechanically to the contact portion 50 via the actuation device 66. In the present case, this means that, by a movement of the contact portion 50, a force can be transmitted via the actuation device 66 to the bracing means 40. When the vehicle wheel 1 with the attachment 14 attached thereto rolls away, the contact portions 50 are moved radially inwards as a result of contact with the road. The bracing means 40 in the above-described configuration are thereby actuated or, in the present case, a force is transmitted to the bracing means 40. The bracing means 40 are pressed by that force towards the wheel disc 2 or the rim flange 10. The bracing means 40, when actuated, engage behind the rim flange 10. When all the bracing means 40 are engaged behind the rim flange 10, the attachment 14 is fastened to the vehicle wheel. If a specific force, or a limit pressure, with which the bracing means 40 is pressed towards the rim flange 10 during the above-mentioned force transmission is exceeded, the two cylinder parts 70 and 72 are pushed into one another. This happens, for example, when the contact portion 50 has not yet reached its end position but the hook portion 42 is already engaged completely behind the rim flange 10 and is resting thereon.

In the present embodiment, the contact portion 50 is in the form of a spring steel sheet 73 which is curved in the peripheral direction U and which urges a portion of a tread body 74 radially outwards. This portion of the tread body 74 thus deviates in the unloaded state from the annular form of the remainder of the tread body 74 and is pressed inwards as the vehicle rolls over the road surface F, wherein the force is transmitted via the pressure transmission device 64 and the actuation device 66 to the bracing means 40.

The pressure transmission device 64 with the actuation device 66 can also comprise a holding mechanism 78. In the present exemplary embodiment, the holding mechanism 78 is so configured that it locks the two cylinder parts 70 and 72 together when the contact portion 50 has entered the tread surface 18 completely. Other forms of the holding mechanism 78 are conceivable. The holding mechanism 78 prevents the bracing means 40 from moving out of engagement behind the portion 11 of the rim 10, or the rim flange 10, if the contact portion 50 is no longer resting on the road surface F, or is no longer subjected to pressure.

Corresponding pressure transmission devices 63, preferably with a actuation device 66 and/or holding mechanism 78, of very different constructions can also be combined with all types of contact portions 50, in particular with a contact portion 50 which, as in the embodiment of FIGS. 8 and 9, is arranged on the side of the tread portion 16 that faces the vehicle wheel 1.

Figure 13:
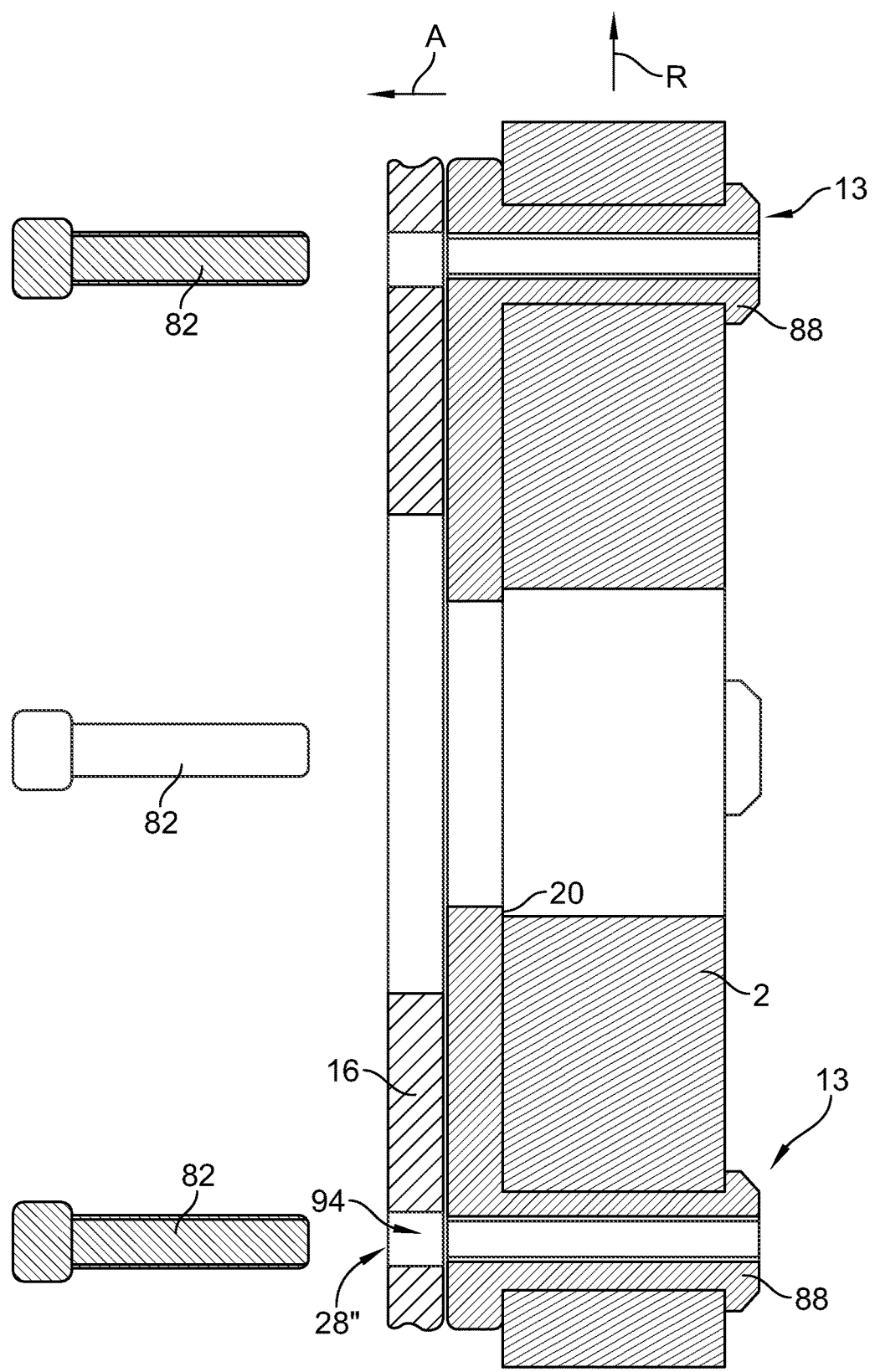
FIG. 13 shows a further alternative of a fastening of an initial mounting portion by means of a grip device.

FIGS. 11 to 13 show examples of a grip device 22.

In the embodiment of FIGS. 11 a) and b), a spreadable sleeve 80, which represents an expandable portion 24 of the grip device 22, is inserted into the opening 13. For fastening the initial mounting portion 20, the initial mounting portion is positioned with its fastening holes 26 over the openings 13. A screw, which represents a spreading element 82, is then screwed into the spreadable sleeve 80, whereby the sleeve is spread apart and thus expanded. In the expanded state, the sleeve 80 forms a friction-based connection with the side walls of the opening 13 and thus with the wheel disc 2. The sleeve 80 can also be connected to the initial mounting portion 20 in an undetachable manner and then represents an example of a part of the grip device 22 that is connected in an undetachable manner to the initial mounting portion 20.

FIG. 11 c) shows an example of a form-fitting engagement of a grip device 22 behind the opening 13. A screw 84 can be screwed into a thread 86, which is provided in the side walls of the opening 13, and engage behind that thread 86 in a form-fitting manner.

It is, however, generally preferred if there is provided on the initial mounting portion 20 a grip device 22 which can engage in a form-fitting manner behind a thread-free opening 13 or can be fastened in a friction-based manner in the thread-free opening 13.

In the embodiment of FIG. 12, a compressible sleeve 88, which comprises a compressible portion 90 of the grip device 22, is shown. FIGS. 12 a) to c) show how the compressible sleeve 88 is inserted into the opening 13.

FIG. 12 b) illustrates the insertion of the compressible sleeve 88 into the opening 13. The compressible portion 90 comprises hook regions 92 which, when guided through the opening 13, can be moved inwards and which, when they have been guided through the opening 13, expand into an uncompressed state and engage behind the opening 13 in a form-fitting manner. The initial mounting portion 20 can then be fastened by means of a screw, which represents a spreading element 82 (FIG. 12 c)).

The compressible sleeve 88 can also be connected to the initial mounting portion 20 in an undetachable manner. Such a version is shown schematically in FIG. 13 in a sectional representation. In the version of FIG. 13, the tread portion 16 is fastened to the initial mounting portion 20 via corresponding holes 94, which together with the spreading elements 82 form a fastening device 28". The initial mounting portion 20 can be clipped, as it were, into the openings 13 via the compressible sleeves 88 which are connected thereto, in the present case in an undetachable manner. The compressible sleeves 88 comprise a compressible portion 90 and represent a grip device 22. The tread portion 16 can then be fastened to the initial mounting portion via the spreading elements 82, wherein it moves in the axial direction A towards the wheel disc 2 during this fastening operation.

Also within the meaning of the invention is a system comprising an attachment 14 and a wheel disc 2 of a vehicle wheel 1, wherein the attachment 14 is configured according to one of the following claims, in particular according to one of the embodiments described hereinbefore, and the wheel disc 2 has at least one or multiple openings 13 which is or are arranged in the wheel disc 2 in the region of the bolt circle 4, and wherein the opening(s) 13 is or are arranged spaced apart from the holes 7 which are provided for receiving wheel bolts, or stay bolts, preferably and from the center openings 6 of the wheel disc 2.

Figure 14:
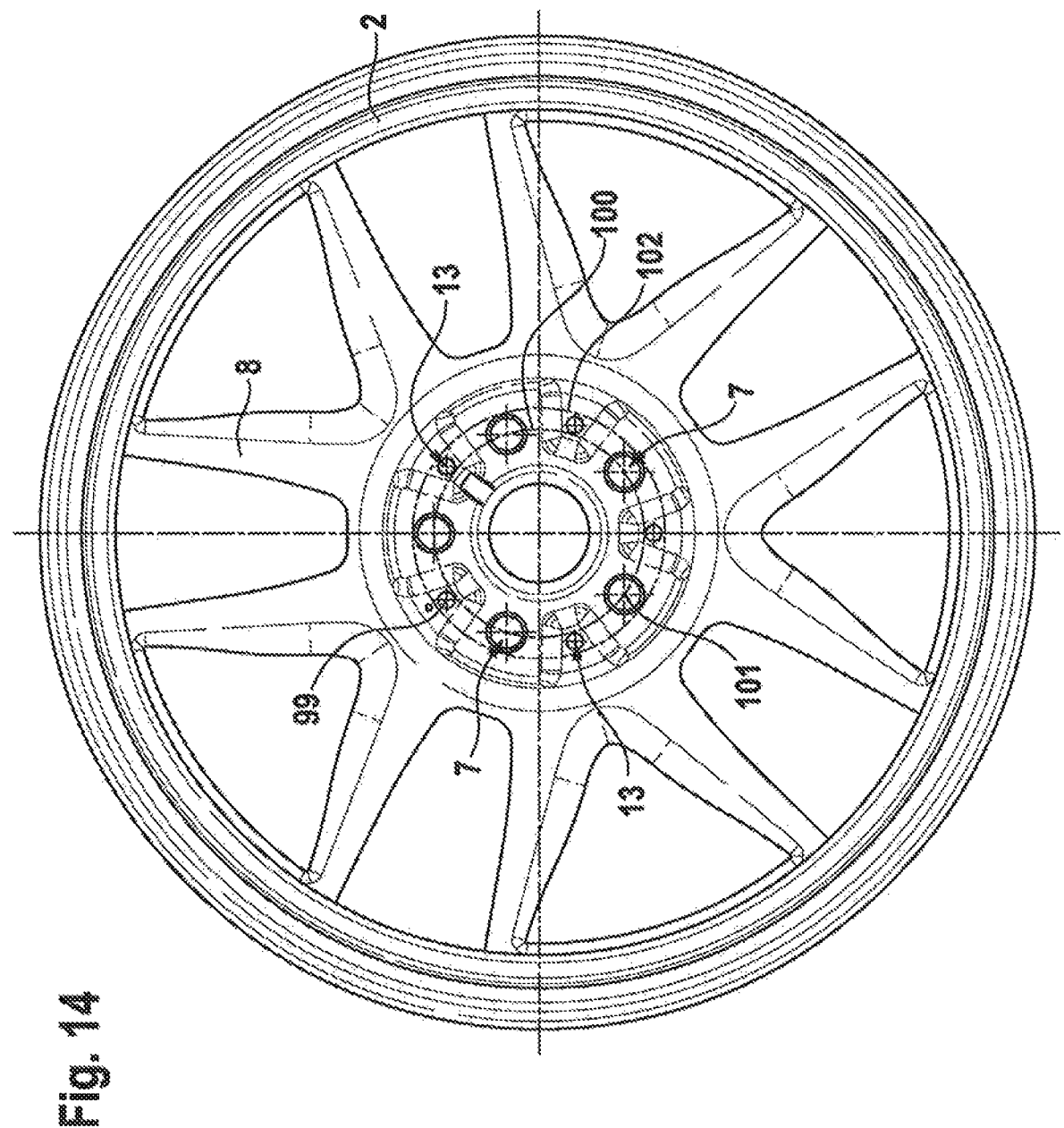
FIG. 14 shows a rim of a system according to the invention.

FIG. 14 illustrates an example of a wheel disc 2 of such a system.

The wheel disc 2 of FIG. 14 has in the present case five openings 13. However, more or fewer openings 13 can also be provided. It is preferred, as shown in FIG. 14, if the mid-points 99 of the openings 13 are arranged spaced apart, preferably radially outwardly spaced apart, from a circle 100 which extends through the mid-points 101 of the holes 7 provided for receiving wheel bolts, or stay bolts. It is also preferred if the mid-points 99 of the openings 13 are arranged spaced apart, preferably radially inwardly spaced apart, from a circle 102 which forms the smallest circle which circumscribes all the holes 7 provided for receiving wheel bolts, or stay bolts. The above statements relating to the position of the openings 13 relate to a direction of observation in the axial direction A.

Preferably, the openings 13 are so arranged between the circles 101 and 102 that they lie with the major part of their cross-section, preferably with their entire cross-section, between the circles.

Figure 15A:
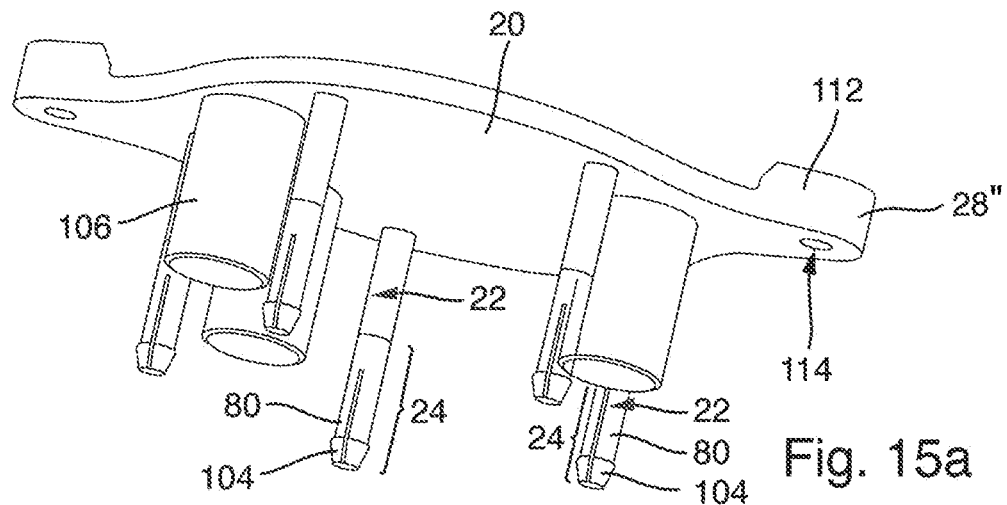
FIG. 15 includes FIGS. 15a to 15c, and shows an initial mounting portion.
Figure 15B:
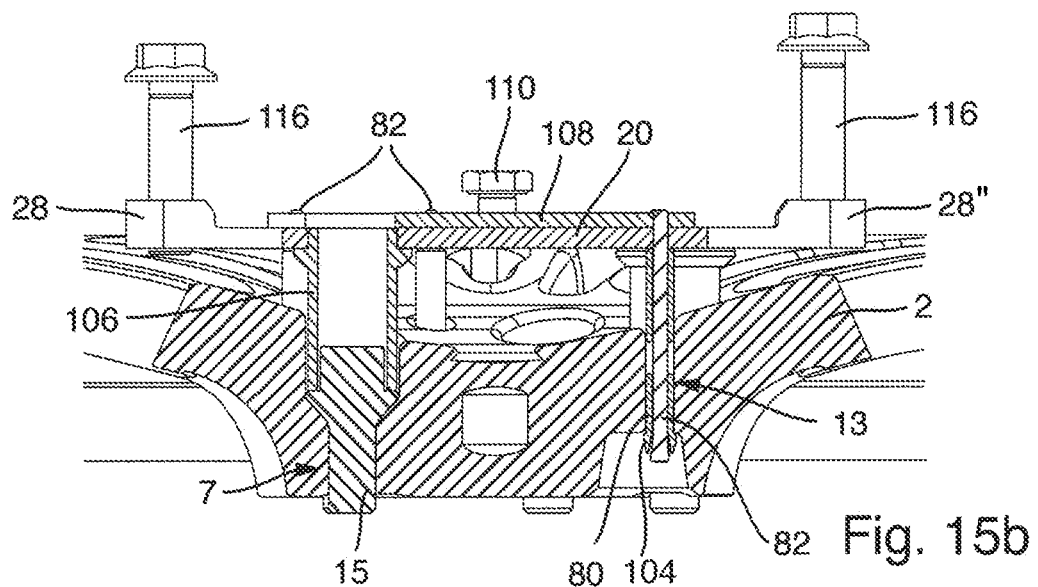
Figure 15C:
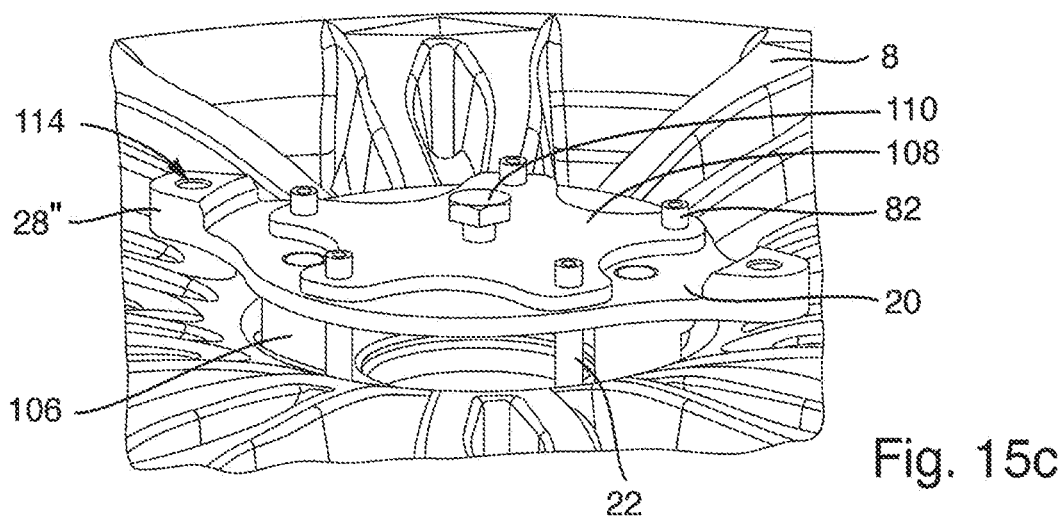

FIG. 15 illustrates an initial mounting portion 20 (FIG. 15a) and the fastening thereof to a vehicle wheel 1, or to the wheel disc 2 of the vehicle wheel 1 (FIGS. 15b and 15c).

The embodiment illustrated in FIG. 15 comprises grip devices 22 which are in the form of hollow rods, or in the form of a spreadable sleeve 80. The grip devices 22 in the form of hollow rods each have an expandable portion 24. Hook-like projections 104 are arranged on the expandable portion 24. The hook-like projections 24 serve to engage in a form-fitting manner behind the openings 13 in the wheel disc 2. The initial mounting portion 20 can further comprise spacers 106. The spacers 106 can serve to specify a defined distance relative to the wheel disc 2. Advantageously, the spacers 106 are in the form of sleeves. It is preferred if the spacers 106 are configured to be fitted onto the wheel bolts 15, or the heads thereof.

In FIG. 15b, the mounting of the initial mounting portion 20 on the rim is illustrated. The initial mounting portion 20 of the present embodiment comprises an actuating part 108, which in the present case is in plate form and to which spreading elements 82 are attached. The actuating part 108 can be connected or capable of being connected to the remainder of the initial mounting portion 20 via a central screw 110 in such a manner that the spreading elements 82 are arranged in the grip devices 22 in the form of hollow rods. Also conceivable are other movable connections between the actuating part 108 and the remainder of the initial mounting portion 20. This configuration is illustrated in FIG. 15b. If the central screw 110 is screwed in, the actuating part 108 moves in the axial direction away from the remainder of the initial mounting part 20. As a result, the spreading elements 82 are moved into the grip devices 22 in the form of hollow rods in such a manner that their respective expandable portion 24 widens and the hook-like projections 24 arranged thereon securely engage in a form-fitting manner behind the openings 13.

The initial mounting portion 20 has a fastening device 28" by means of which a tread portion 16, as is shown, for example, in FIGS. 3 to 9, can be fastened to the initial mounting portion 20. The fastening device 28" illustrated in FIG. 15 has two limbs 112 which extend radially outwards, each of which comprises a hole 114 having a thread into which there can be screwed corresponding screws 116, by means of which the tread portion 16 can be fastened to the initial mounting portion 20.

Figure 16A:
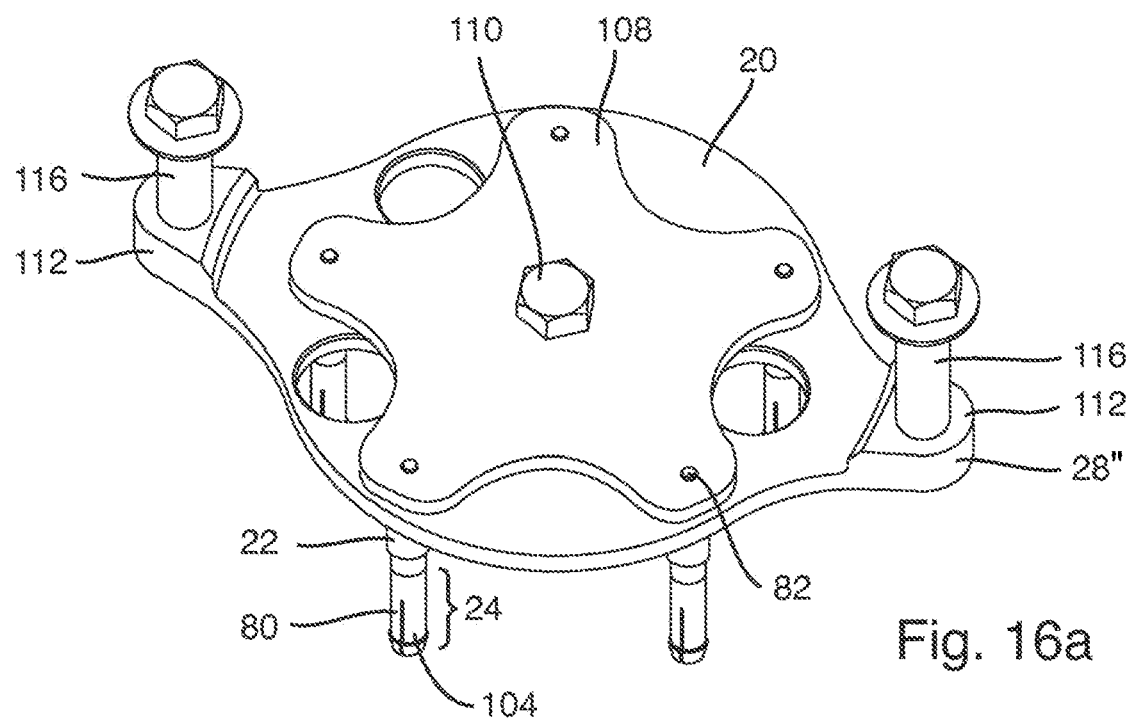
FIG. 16 includes FIGS. 16a and 16b, and shows different variants of an initial mounting portion.

FIG. 16*a* shows the initial mounting portion 20 of FIG. 15 in a perspective representation.

Figure 16B:
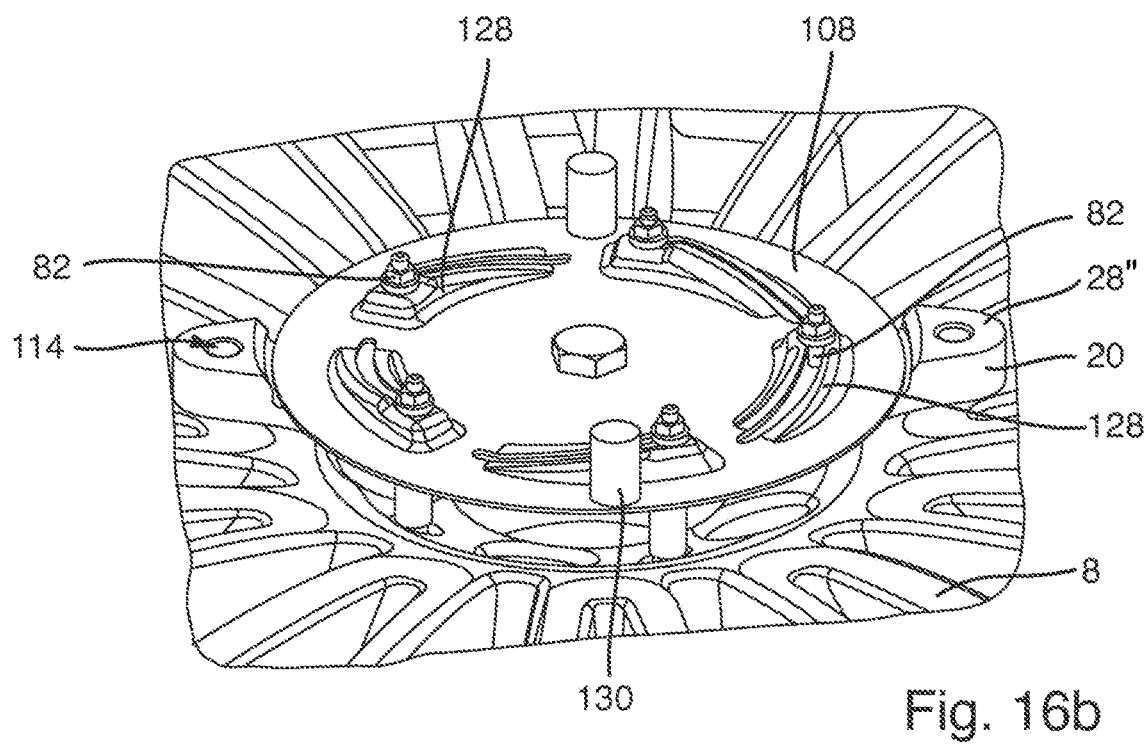

FIG. 16*b* shows an alternative form of the initial mounting portion 20. In the initial mounting portion 20 of FIG. 16, the actuating part 108 is provided with slots having the shape of circular segments, which run on ramp-like elevations 128. By rotation of the actuating part 108, the spreading elements 82 are moved into the grip devices 22 by sliding along the ramp-like elevations, whereby the grip devices are spread. Rotation of the actuating part 108 can be carried out manually via corresponding handles 130.

The described actuating parts 108 are to be understood merely by way of example. In general, the actuating part 108 can be configured to be able to bring about a movement of the spreading elements 82 by a movement of the actuating part 108 relative to the remainder of the initial mounting portion 20, such that the grip devices 22 come into form-fitting engagement behind the corresponding openings 13, in particular such that expandable portions 24 on the grip devices 22 are widened or spread apart.

FIG. 17 shows a further possible form of an initial mounting portion 20. The fastening device 28" thereby corresponds to the form of the fastening device 28" of FIG. 15. Other forms of a fastening device 28" for fastening the tread portion 16 are possible.

The initial mounting portion 20 illustrated in FIG. 17 has a grip device 22. The initial mounting portion 20 is configured to be fastened to the vehicle wheel 1 via a friction-based engagement of the grip device 22 with the center opening 6 of the wheel disc 2. It is also possible that the grip device 22 is configured to engage in the center opening 6 in a form-fitting manner.

Figure 17A:
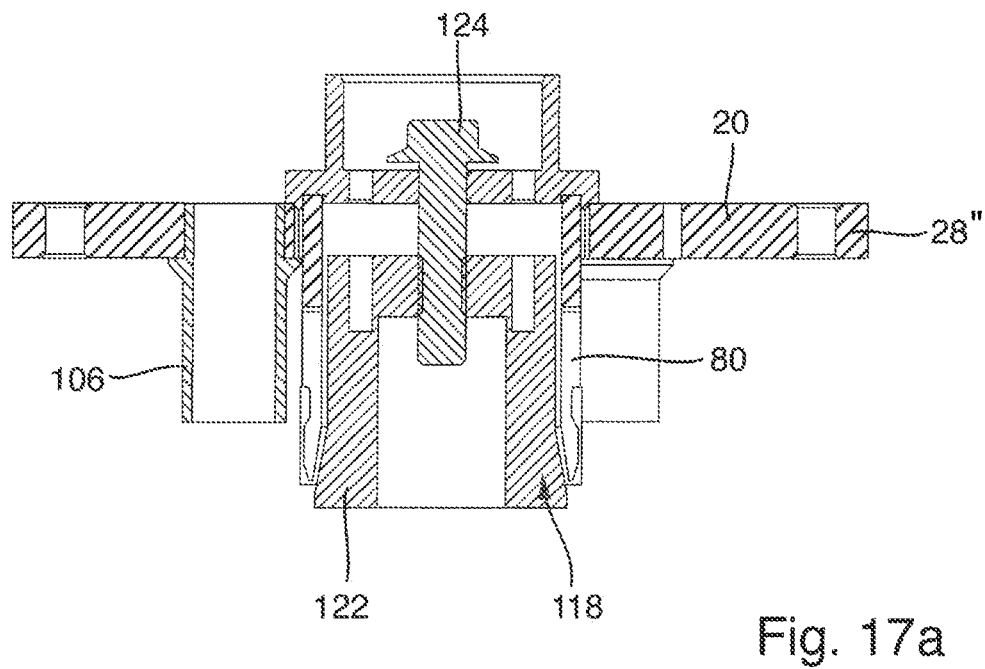
FIG. 17 includes FIGS. 17a and 17b, and shows an initial mounting portion for fastening via a center opening.
Figure 17B:
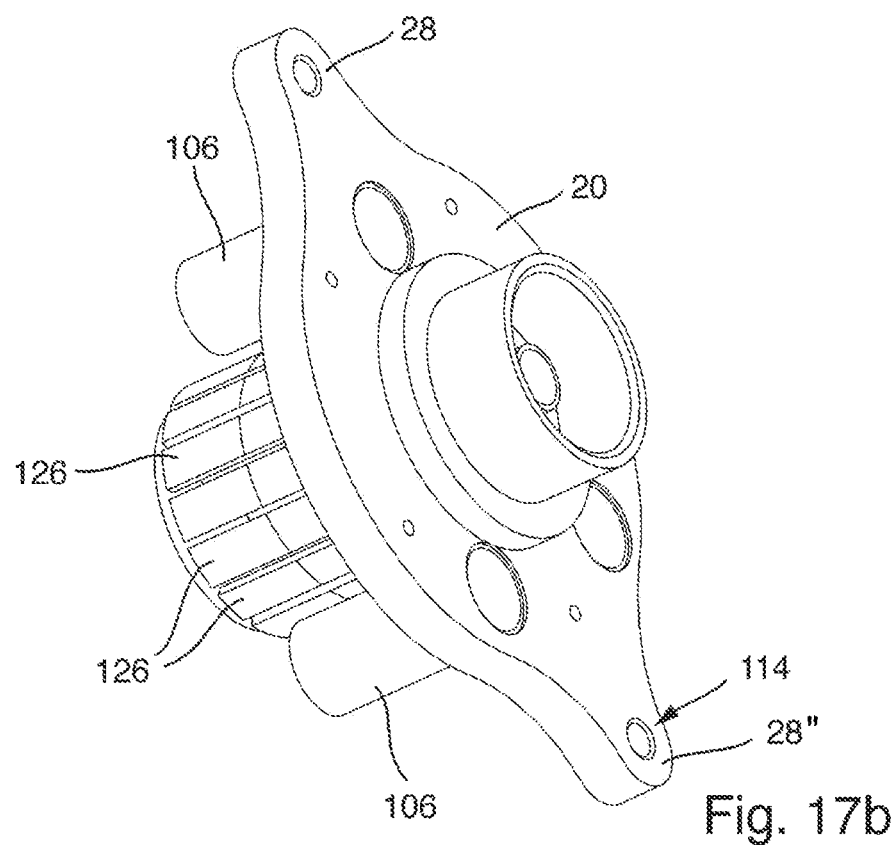

In the example of FIG. 17, the grip device 22 is in the form of a slotted or spreadable sleeve 80. Inside the slotted or spreadable sleeve 80 there is arranged an element 118 of varying radial extent, which in the present case is in the form of a cone element (the element 118 has a cone-shaped portion 122). The element 118 of varying radial extent is movable in the axial direction A relative to the slotted or spreadable sleeve 80. For moving the element 118 in the axial direction A relative to the slotted or spreadable sleeve 80, the initial mounting portion 20 has a bracing screw 124. As a result of the axial movement of the element 118 (upwards in the representation of FIG. 17*a*), the slotted or spreadable sleeve 80 can be spread apart, so that it engages in a friction-based manner in the center opening 6. In the present case, this means that it extends into the center opening 6 and engages it from inside or rests on the wall of the center opening 6 from the inside in a friction-based manner. The slotted sleeve 80 has a plurality of spreadable arms 126. The arms 126, which are movable, in particular bendable, radially outwards, represent an expandable portion 24. The arms 126 can also be spaced substantially further apart from one another than is shown in FIG. 17*b*. It is, for example, possible that only two spreadable arms 126, which are preferably arranged opposite one another, are present. Projections can be arranged on one or more of the arms 126, or on the expandable portion 24 in general, which projections are able to engage into a corresponding groove, or into a recess in the center opening 6 in general. Fastening can take place via form-fitting engagement.

FIG. 18 illustrates different embodiments of grip devices 22 which can be inserted into openings 13, preferably into polycontrol bores, of the wheel disc 2 and can there serve for fastening by means of form-fitting engagement or friction-based engagement.

Figure 18A:
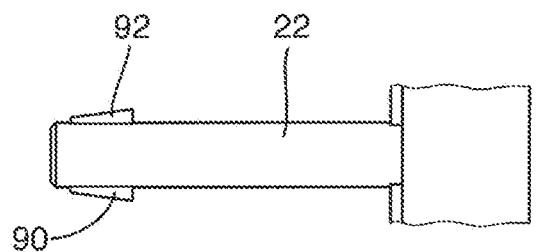
FIG. 18 includes FIGS. 18a to 18d, and shows different embodiments for grip devices.

The variant shown in FIG. 18*a* is similar to the embodiment shown in FIG. 12. However, the variant of FIG. 18*a* of a grip device 22 is formed merely by a rod-like element having multiple hook regions 92, which represent a compressible portion 90. The variant of FIG. 18*a* does not require a spreading element 82. With the grip devices 22 according to FIG. 18*a*, the initial mounting portion 20 can be inserted almost directly into the opening(s) 13, or polycontrol bore(s). The grip devices 22 can be attached fixedly (similarly to FIG. 13) or detachably to the initial mounting portion 20 or can be configured to be inserted through the initial mounting portion.

Figure 18B:
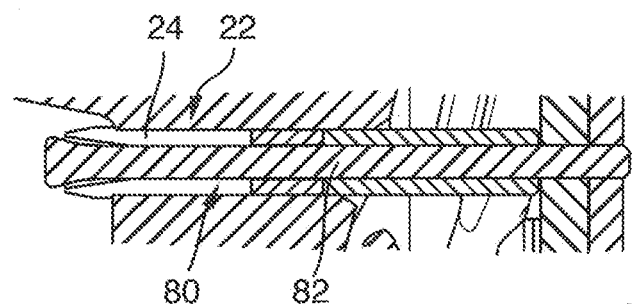

The variant shown in FIG. 18*b* is configured corresponding to the variants of the grip device 22 shown in FIGS. 15 and 16. The grip device 22 of FIG. 18*b* is configured for form-fitting engagement.

Figure 18C:
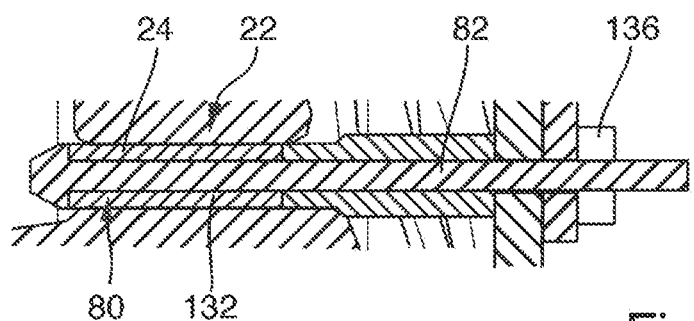

The variant of the grip device 22 shown in FIG. 18*c* is configured for friction-based engagement. For this purpose, the grip device 22 has an expandable portion 24, which in the present case is formed by a compressible sleeve 132. A compressible sleeve 132 means a sleeve whose radial extent increases when its axial extent is reduced. When the spreading element 82 is tightened, in the present case via the nut 136, the axial extent of the compressible sleeve 132 is reduced and the radial extent of the compressible sleeve 132 increases. The compressible sleeve 132 thereby rests in a friction-based manner against the inside wall of the opening 13, and friction-based engagement is achieved.

Figure 18D:
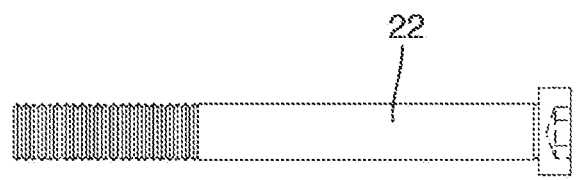

The variant of the grip device 22 shown in FIG. 18*d* is configured for form-fitting engagement. In the variant of FIG. 18*d*, the grip device 22 is formed by a screw. This requires the opening 13 to have a thread, or a mating thread to be arranged behind the opening, into which the screw can be screwed.

It is preferred if the grip device 22 is configured for thread-free form-fitting engagement in the opening 13. This means that the opening 13 does not have a thread, nor is a mating thread arranged behind the opening, into which the grip device 22 could engage. A thread thereby also means that, if a material is introduced into the opening 13, the screw can cut a thread automatically, or such a material is arranged behind the opening 13. The use of such a material in conjunction with a thread-cutting screw is, however, also within the meaning of the invention. Preferably, the grip device 22 itself is thread-free. It thus does not have a thread for generating the form-fitting engagement. A thread can, however, be present for moving the grip device 22. For example, the embodiment of FIG. 15*b* has a thread-free grip device 22.

Figure 19A:
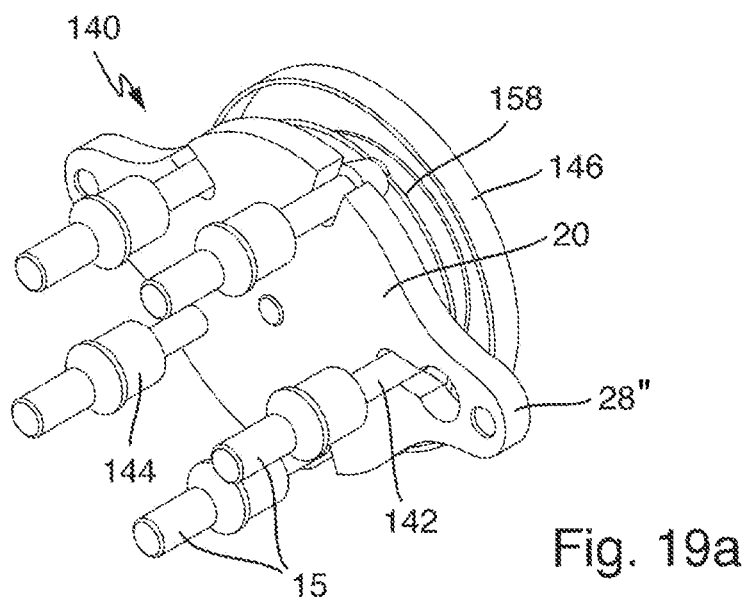
FIG. 19 includes FIGS. 19a to 19c, and shows an initial mounting portion having a bending device.
Figure 19B:
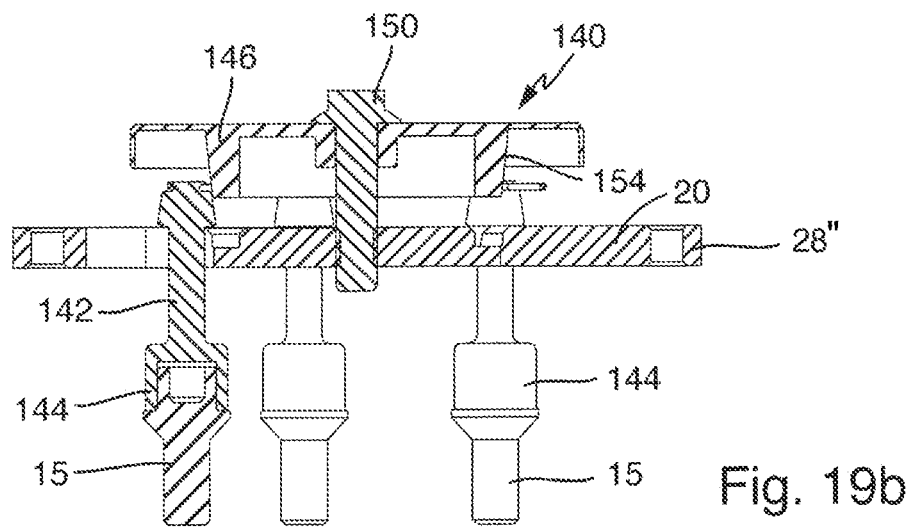
Figure 19C:
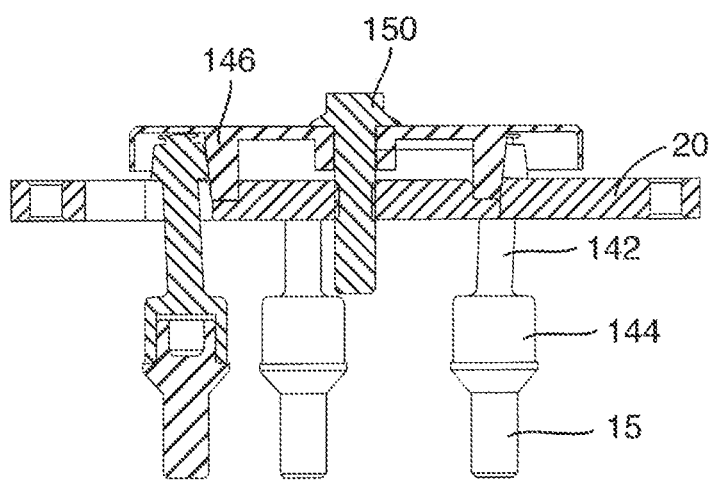

FIG. 19 illustrates an initial mounting portion 20, which is configured to be fastened via a clamping device 140 to wheel bolts 15 of the vehicle wheel 1, wherein the clamping device 140 is configured to engage at least two wheel bolts 15 jointly in a clamping manner and to grasp them. The clamping device 140 comprises multiple fastening elements 142. The clamping device 140 has at least two fastening elements 142, but preferably, as shown in FIG. 19, one fastening element for each wheel bolt 15. The fastening element 142 can be configured to be inserted into an opening in the head of the wheel bolt 15 (FIG. 20*c*). It is also possible for the fastening element 142 to be configured to be placed onto the head of a wheel bolt (FIGS. 19*a-c* and FIGS. 20*a* and 20*b*), wherein the fastening element 142 can be configured with a portion 144, which receives the bolt head, complementary to the outer contour (usually a hexagon) of the head of the wheel bolt 15, or the portion 144 of the fastening element 142 which receives the bolt head can have longitudinal grooves on its inner side in order to prevent rotation of the fastening element 142 relative to the bolt head.

The clamping device 140 comprises a bending device 146. In the present case, the bending device 146 is configured to bend the fastening elements 142, preferably, as shown, all the fastening elements 142, away from one another when they are placed onto the head of the wheel bolt(s) 15 (FIGS. 19a-c and FIGS. 20a and 20b) or inserted into the opening in the head (FIG. 20c) of the wheel bolt 15.

The bending device 146 can also be configured to bend the fastening elements 142 towards one another when they are placed onto the head of the wheel bolt(s) 15 (FIGS. 19a-c and FIGS. 20a and 20b) or inserted into the opening in the head (FIG. 20c) of the wheel bolt 15.

In the present example, the bending device 146 bends the fastening elements 142 away from one another when it is moved towards the fastening elements 142 via the screw 150. As a result of being bent towards one another or away from one another, the fastening elements 142 are braced against one another. As a result, the clamping device 140 engages the wheel bolts 15 jointly in a clamping manner and grasps them in a clamping manner.

As is shown in FIG. 19, the bending device 146 can be so configured that it is movable, for example by means of the screw 150, in the axial direction relative to the remainder of the initial mounting portion 20, or the fastening elements 142. As it is moved axially towards or away from the initial mounting portion 20, or towards or away from the fastening elements 142, the fastening elements 142 are bent towards one another or away from one another. This can be achieved, for example, via a beveled surface 154 on the bending device 146, as shown in FIG. 19.

FIG. 19b shows the fastening elements 142 in the unbraced state, and FIG. 19c shows them in the braced state, or the state in which they are bent away from one another.

It is also conceivable if the bending device 146 is in the form of tension ring (not shown) which surrounds the fastening elements 142 and can be reduced in diameter or is arranged between the fastening elements 142 and is expandable. It is possible, as is shown in FIG. 19, that the bending device 146 is biased via a spring 158 towards the initial mounting portion 20, or towards the fastening elements 142, or away from the initial mounting portion or the fastening elements. The bending device 146 can be moved against the biasing direction of the spring 158 via the screw 150.

The bending device 146 can also comprise an element, preferably a plate-shaped element (similar to the actuating part 108 with slots having the shape of circular segments of FIG. 16b), having arcuate slots which deviate overall from a circular path. Such an element does not have elevations 128, and the slots having the shape of circular segments, unlike in FIG. 16b, do not extend overall on a circular path but deviate therefrom. On rotation of the element, the fastening elements 142 located in the slots having the shape of circular segments are thus bent inwards or outwards, depending on the direction in which the slots deviate from the circular path.

Figure 20A:
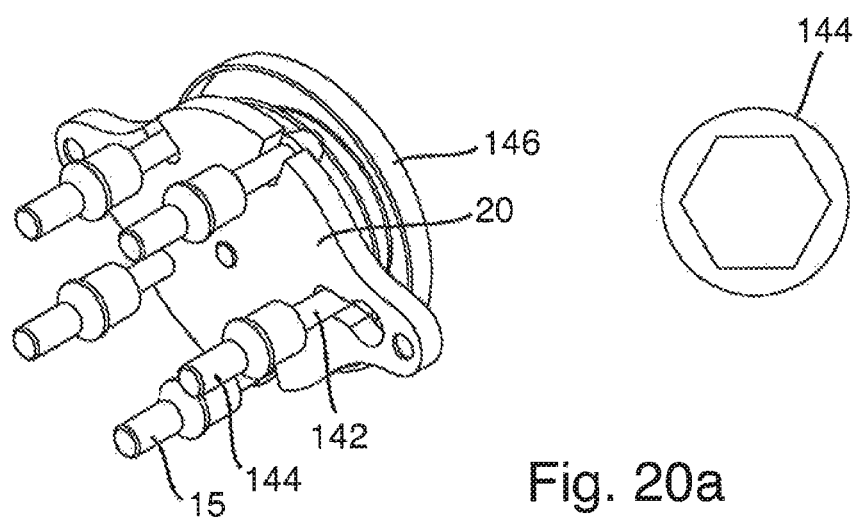
FIG. 20 includes FIGS. 20a to 20c, and shows different possible variants of a fastening element.
Figure 20B:
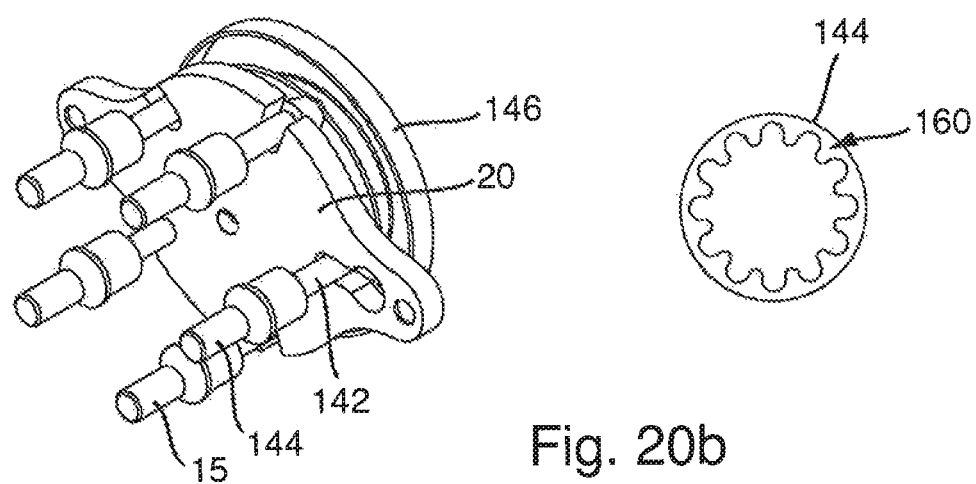
Figure 20C:
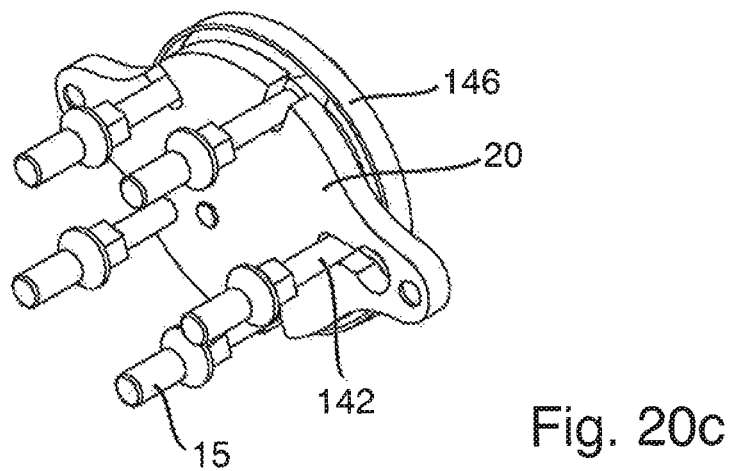

FIG. 20 illustrates different possible types of the fastening element 142, in particular of the portion 144 which receives the bolt head. The portion 144 which receives the bolt head can be configured to be complementary to the outer contour (usually a hexagon) of the head of the wheel bolt 15 (FIG. 20a). The portion 144 of the fastening element 142 which receives the bolt head can also have longitudinal grooves 160 on its inner side in order to prevent rotation of the fastening element 142 relative to the bolt head (FIG. 20b).

FIG. 20c illustrates a type of fastening element 142 in which the fastening element 142 can be inserted into an inner recess on the bolt head.

FIG. 21 illustrates a possible method of connecting the tread portion 16 and the initial mounting portion 20 in such a manner that the tread portion 16 is movable in the axial direction A relative to the initial mounting portion 20 via an actuating device 162.

Figure 21A:
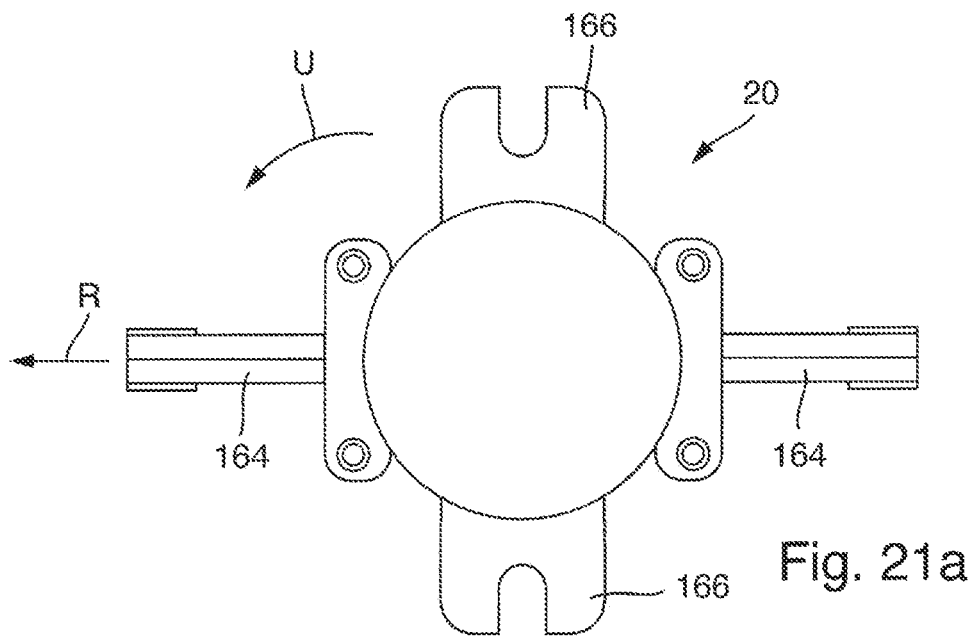
FIG. 21 includes FIGS. 21a to 21c, and shows a possible method of connection between the tread portion and the initial mounting portion.

FIG. 21a shows the initial mounting portion 20 looking in the axial direction. The initial mounting portion 20 of the embodiment shown has two protruding mounting arms 164 for attachment of the tread portion 16. The initial mounting portion 20 of the embodiment shown also has two receivers 166 which are each configured to receive a mounting element 168. The mounting element 168 will be discussed in greater detail in connection with FIG. 21b.

The mounting arms 164 can be configured so that a one-part tread portion 16 can be attached thereto. Preferably, however, the mounting arms 164 are so configured that a tread portion 16 having a first peripheral segment 32 and a second peripheral segment 34 can be attached to the initial mounting portion 20. On mounting, the initial mounting portion 20 can first be fastened to the wheel disc 2 in the region of the bolt circle 4 via form-fitting engagement in the region of the bolt circle 4 of the wheel disc 2 and/or via a connection, preferably a friction-based connection, in the region of the bolt circle 4 of the wheel disc 2, to the vehicle wheel 1 in the region of the bolt circle 4 of the rim, for example in one of the ways mentioned above.

The first peripheral segment 32 can then be placed onto the initial mounting portion 20 and, by actuation of the actuating device 162, moved in the axial direction A towards the initial mounting portion via the actuating device 162.

Preferably, the tread portion 16 has bracing means 40 which are configured to engage with a hook portion 42 behind a portion 11, in the present case the rim flange 10, of the rim 2a of the vehicle wheel 1. Preferably, the attachment 14 comprises a bracing mechanism 52 having a contact portion 50, which is preferably arranged on the tread portion 16, wherein the contact portion 50 is preferably arranged on the side of the attachment 14 that faces the vehicle wheel 1. The contact portion 50 can preferably be so arranged that, when the tread portion 16 is moved in the axial direction A relative to the initial mounting portion 20 by means of the actuating device 162, the contact portion 50 contacts the vehicle wheel 1 and/or the initial mounting portion 20 and is thereby actuated. The attachment, or the respective peripheral segment 32, 34, can thus engage almost automatically behind the rim flange 10 with the bracing means 40 on actuation of the actuating device 162.

A pneumatic actuating device 162 is shown in the present case. However, the actuating device 162 can also be purely mechanical, in particular spring-biased, in form. It is also conceivable to provide an actuating device 162 which works pneumatically and with spring biasing. An electrical actuating device 162 is also possible.

Regarding the functioning of the actuating device 162: A peripheral segment 32, 34 is placed onto the mounting arms 164. The mounting element 168 is inserted into the receivers 166 on the initial mounting portion 20. The mounting element 168 is displaceably mounted in the peripheral segment 32, 34 of the tread portion 16. The mounting element 168 extends with a piston portion 170 into a pressure chamber 172. The pressure chamber 172 has a pressure medium connection 174 having a valve 176. A pressure medium source 178 can be connected to the pressure medium connection 174. Such a pressure medium source 178 can be a small gas cartridge, as is known, for example, from repair sets for bicycle tires. Such a pressure medium source 178 can, however, also be a further tire of the vehicle which still has sufficient air pressure. The use of a compressor is also conceivable.

Figure 21B:
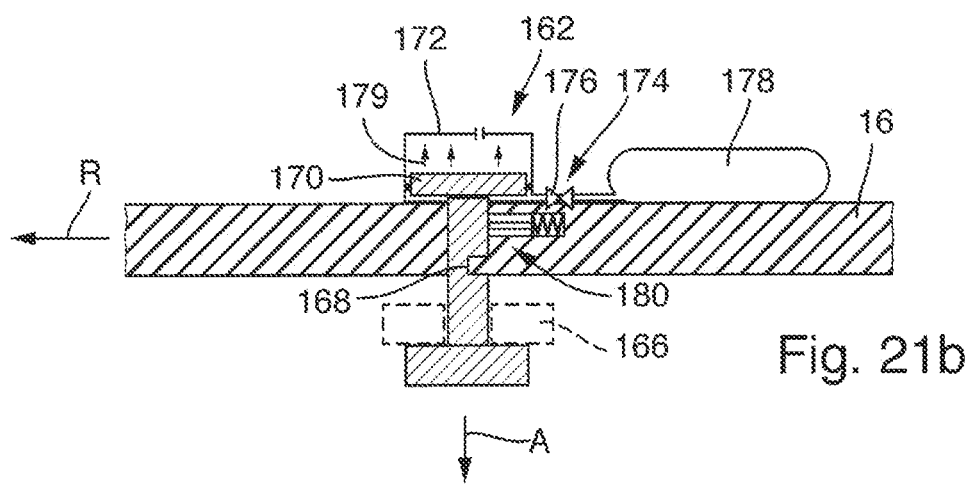

If the pressure medium source is connected to the pressure medium connection 174, then the valve 176 can be opened and pressure medium is applied to the pressure chamber 172. The piston portion 170 then moves in the pressure chamber 172 in such a manner that the tread portion 16, or, in the case of a multi-part tread portion 16, the respective peripheral segment 32, 34, moves in the axial direction A towards the initial mounting portion 20, or towards the vehicle wheel 1. This movement is illustrated in FIG. 21b by the arrows 179.

"The tread portion 16 is connected or can be connected to the initial mounting portion 20 in such a manner that it is movable via the actuating device 162 in the axial direction A relative to the initial mounting portion 20" also means that at least part, in particular a peripheral segment 32, 34, of the tread portion 16 is movable in the axial direction A relative to the initial mounting portion 20. Preferably, the entire tread portion 16, or all the peripheral segments 32, 34, is/are movable via the actuating device 162.

Preferably, the attachment, in particular the tread portion 16, has a locking mechanism 180 which locks the tread portion 16 (or a respective peripheral segment 32, 34) in its position relative to the initial mounting portion 20 when it has moved into the intended position relative to the initial mounting portion 20. FIG. 21b shows a spring-biased rod as an example of the locking mechanism 180, which rod latches into a recess on the mounting element 168 when the tread portion 16 has moved towards the initial mounting portion 20.

It is also conceivable that the mounting element 168, instead of being moved by the pressure medium, or in addition to being moved by the pressure medium, is moved via a biased spring, in particular a compression spring, which is unlocked on mounting of the tread portion 16 and thereby moves the mounting element 168 in such a manner that the tread portion 16 moves towards the initial mounting portion 20. Other forms of the actuating device 162 which, on actuation, cause a relative movement between the tread portion 16 and the initial mounting portion 20 are likewise within the meaning of the invention. Preferably, the actuating device 162 is so configured that the tread portion 16 moves towards the initial mounting portion 20 when the actuating device 162 is actuated.

Figure 21C:
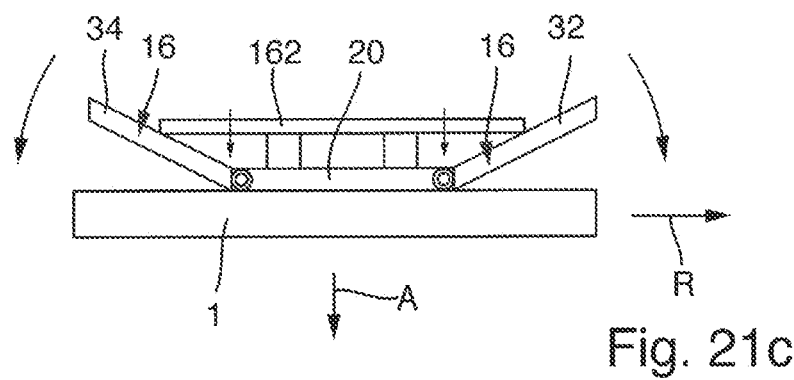

FIG. 21c illustrates a further possible form of the actuating device 162. In the embodiment of FIG. 21c, two peripheral segments 32, 34 of the tread portion 16 are pivotably attached to the initial mounting portion 20. On actuation of the actuating device 162, the peripheral segments 32, 34 are pivoted towards the vehicle wheel 1.

Within the meaning of the invention is an attachment 14 which comprises an actuating device 162 which is configured to cause a relative movement between the initial mounting portion 20 and the tread portion 16, or the peripheral segments 32, 34 thereof.

Within the meaning of the invention, the tread portion 16 can be movable in the axial direction A relative to the initial mounting portion 20 via the actuating device 162 both by translation and pivotably (illustrated by the example of FIG. 21c).

Figure 22:
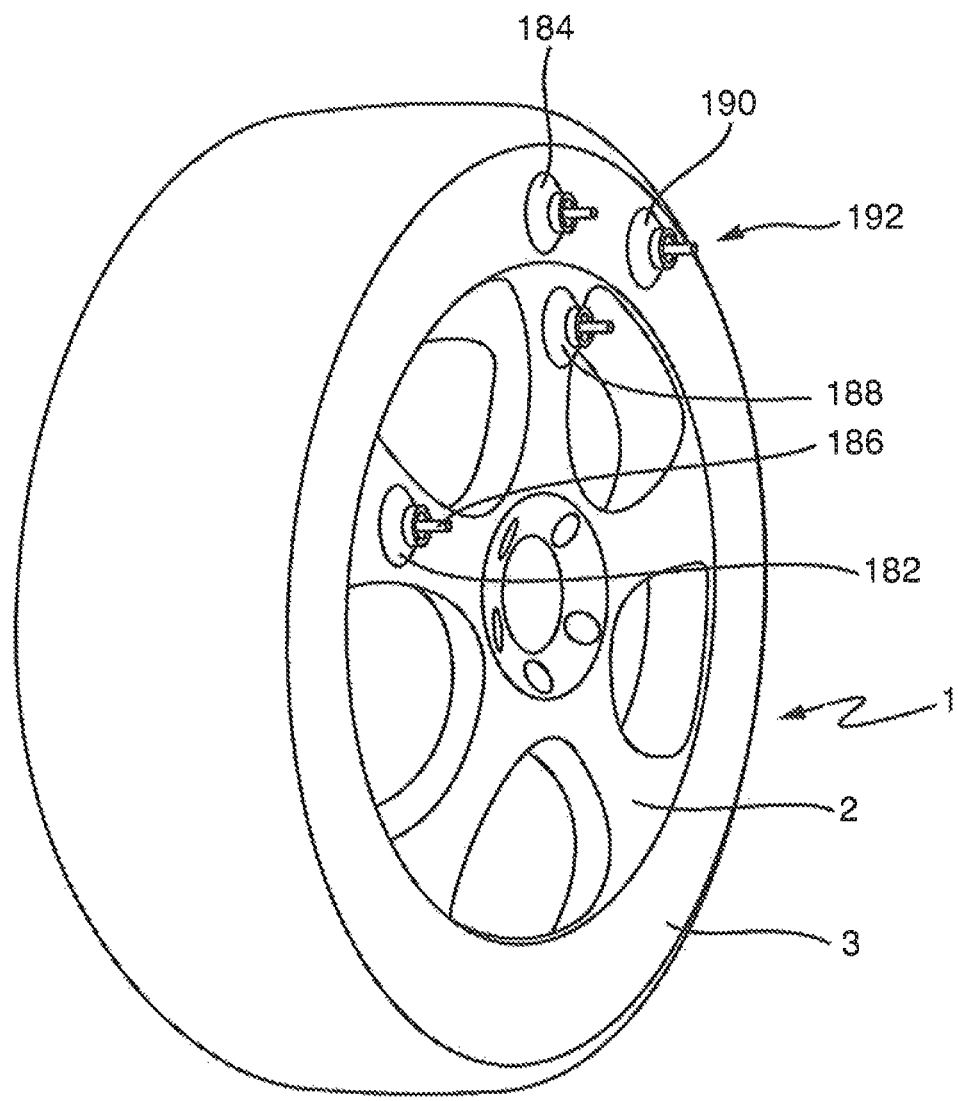
FIG. 22 shows suction cups which can be used for fastening the attachment.

As illustrated in FIG. 22, suction cups 182, 184 can be used for fastening the attachment 14. It is also conceivable in particular that the initial mounting portion 20 is configured to be fastened to the vehicle wheel 1, in particular in the region of the bolt circle 4 of the wheel disc 2 of the vehicle wheel 1, by means of suction cups 182. For this purpose there are advantageously provided suction cups 182 which are configured to adhere to the wheel disc 2 via negative pressure. For attachment of the initial mounting portion 20, the suction cups 182 can comprise rod-like prolongations 186, in particular having a thread. In addition or alternatively, the tread portion 16 can be fastened via suction cups 182 to the wheel disc 2 and/or via further suction cups 184 to the tire 3.

It is also conceivable in particular that the initial mounting portion 20 is configured to be fastened to the vehicle wheel 1, in particular in the region of the bolt circle 4 of the wheel disc 2 of the vehicle wheel 1, by means of a material-bonded connection, in particular an adhesive connection. A material-bonded or adhesive connection can be achieved in particular via suction cups 188 coated with adhesive, wherein the suction cups 188 coated with adhesive do not necessarily have to maintain a negative pressure. It is also conceivable that a composition that bonds to the rubber of the tire 3 is used. In particular, suction cups 190 can be coated with such a composition. The suction cups 190 can then enter into a material-bonded connection with the tire based on a chemical reaction with the tire 3.

The suction cups 184, 190 can be used on the one hand to fasten the attachment 14 to the vehicle wheel 1 and on the other hand to fix the tire 3 to the attachment 14 fixedly connected to the vehicle wheel 1 so that it is held firmly while driving and cannot come away from the wheel disc 2.

Figure 23A:
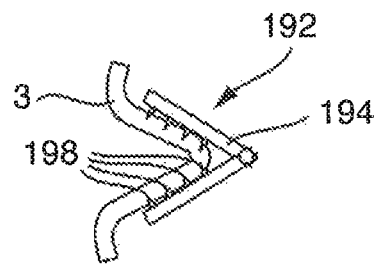
FIG. 23 includes FIGS. 23a to 23d, and shows tire gripping devices and an attachment according to an independent invention.

It is generally within the meaning of the invention if the attachment 14 has a tire holding device 192 which is configured to hold the tire 3 on the attachment 14. A possible tire holding device 192 of this type is one or more of the above-mentioned suction cups 184, 190 of FIG. 22. A further possibility of such a tire holding device 192 is illustrated in FIG. 23a and given by a tire gripping device 194 which is configured to bite into the tire 3 of the vehicle wheel 1 and to clamp the tire material. Preferably, the tire gripping device 194 has for this purpose tooth-like projections 198 which are configured to penetrate the material of the tire 3.

An independent invention is an attachment 14 for a vehicle wheel 1 for enabling driving operation with reduced tire function, having a tread portion 16 which comprises a tread surface 18 of the attachment 14, wherein the attachment 14 comprises at least one tire gripping device 194 which is configured to bite into the tire 3 of the vehicle wheel 1 and clamp the tire material or to bite into the tire 3 of the vehicle wheel 1 and penetrate the tire material.

Figure 23B:
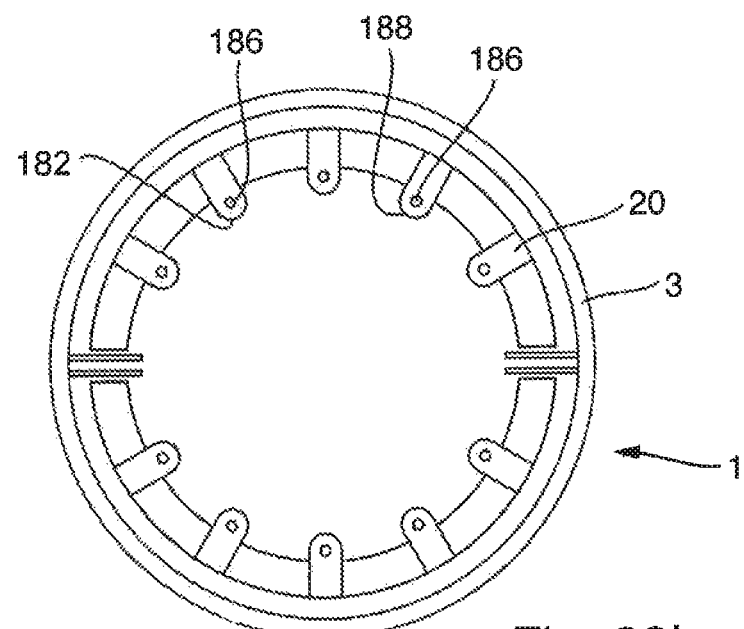
Figure 23C:
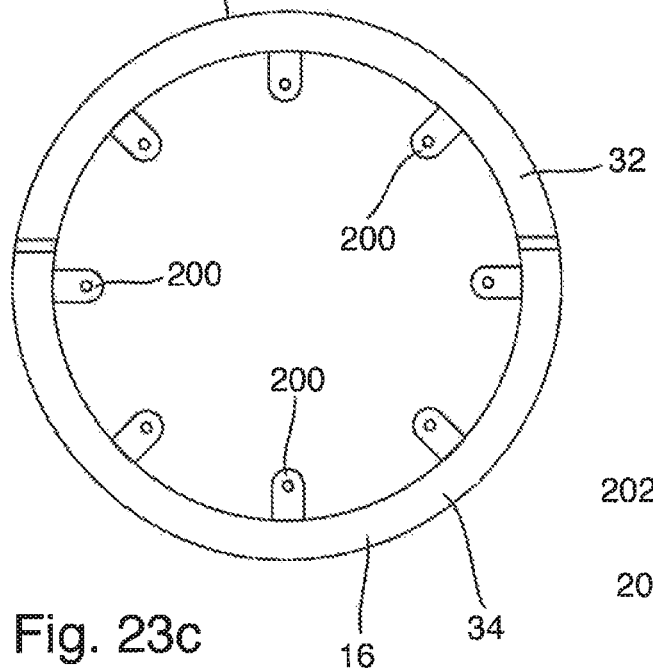

A further independent invention is illustrated in FIGS. 23b and c. The invention relates to an attachment 14 for a vehicle wheel 1 for enabling driving operation with reduced tire function, having an initial mounting portion 20 which comprises an attachment device 198, in particular suction cups 182, 184, 188, 190, by means of which it can be attached to the vehicle wheel 1, in particular to the wheel disc 2, preferably in the radially outer region of the wheel disc 2, wherein the attachment comprises a tread portion 16 which has a tread surface 18 of the attachment 14, wherein the tread portion 16 can be connected to the initial mounting portion 20 via a connecting device 200 (this can also be formed, for example, by the above-described actuating device 162), wherein the tread portion 16 preferably comprises at least one tire gripping device 194 and/or a tire holding device 192, preferably wherein the tread portion 16 comprises at least two peripheral segments 32, 34.

Figure 23D:
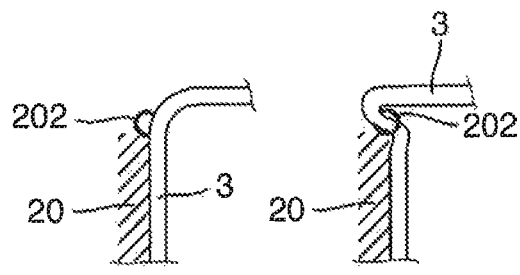

FIG. 23d illustrates a further possible variant of a tire gripping device 194. The variant shown in FIG. 23d comprises hook-like gripping elements 202 which are pivotable through the material of the tire in order to grip it (FIG. 23d right). The hook-like gripping elements 202 bite into the material of the tire 3 of the vehicle wheel 1 and penetrate the tire material.

Figure 24A:
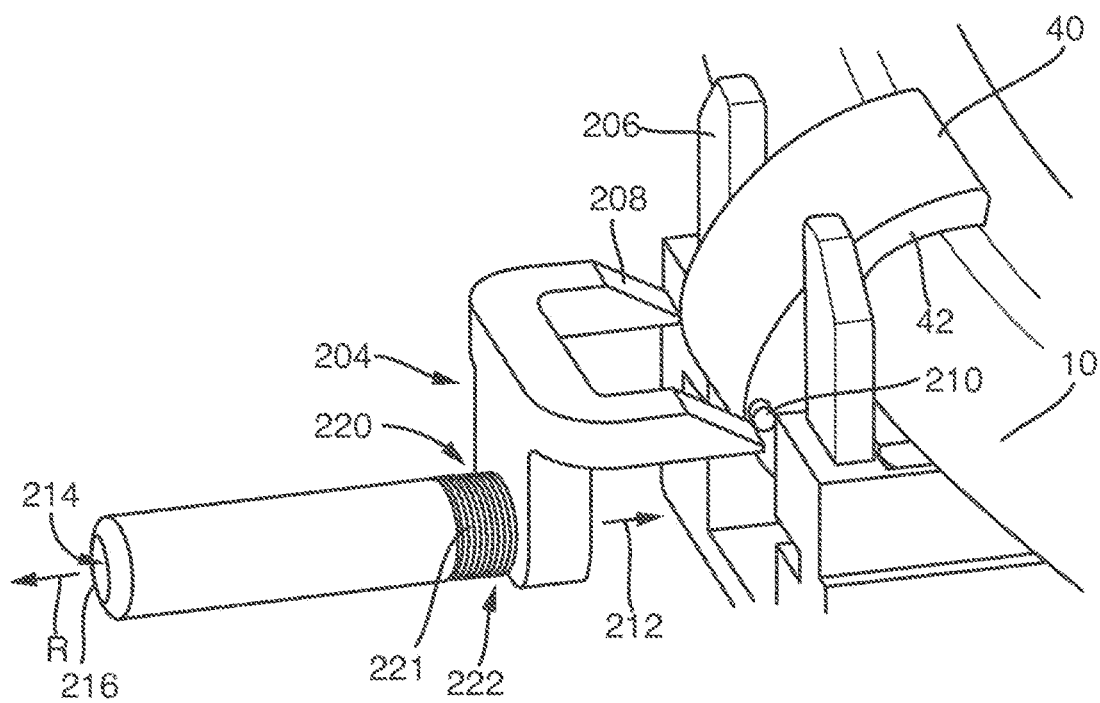
FIG. 24 includes FIGS. 24a and 24b, and shows details of a bracing means locking device.
Figure 24B:
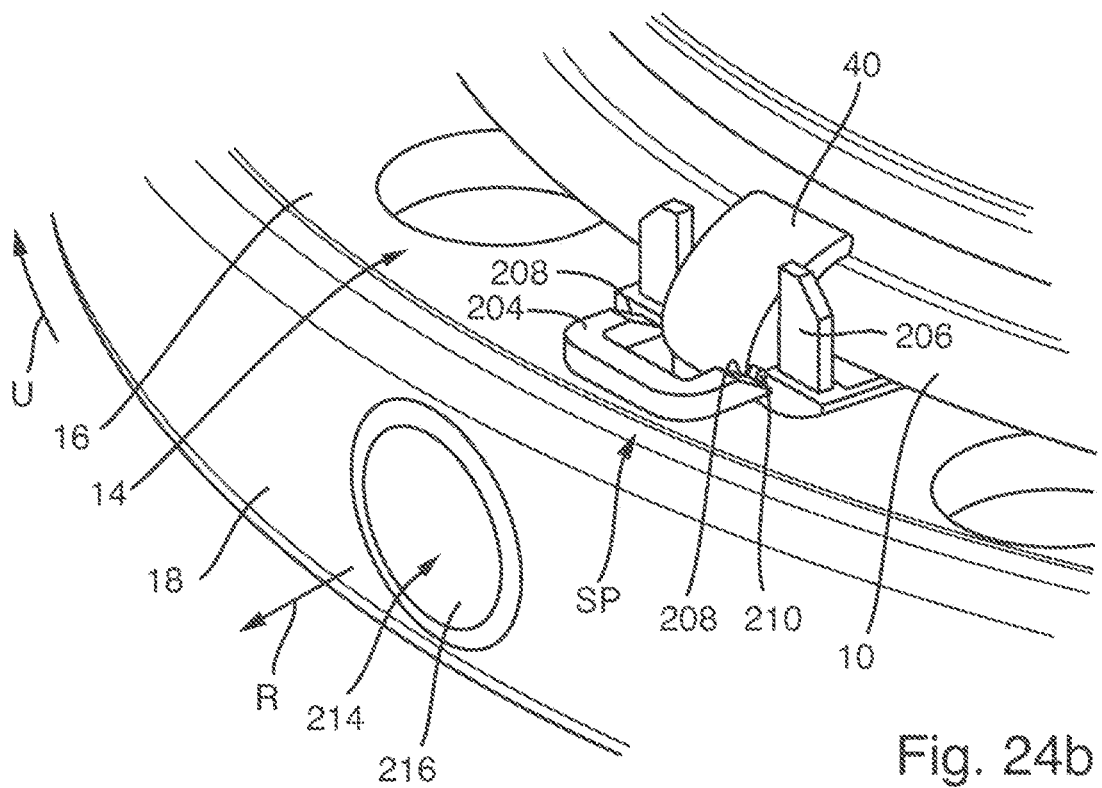

FIGS. 24a and 24b show a portion of an attachment 14 which comprises a bracing means locking device 204 which can be moved into a securing position SP and is configured, in the securing position SP, to lock the bracing means 40, in particular by form-fitting locking (see FIG. 24b), in such a manner that the hook portion 42 cannot be moved out of engagement behind the portion 10 of the rim 2a of the vehicle wheel 1 as long as the bracing means locking device 204 is in the securing position SP. The attachment is shown only in part in FIG. 24a, in particular the tread portion is not shown, in order to make the depiction of the bracing means locking device 204 and the bracing means 40 more clearly visible.

In the present example, locking in the securing position SP is ensured in that a movable bracing surface 208 of the bracing means locking device 204 engages in a form-fitting manner behind a projection 210, which in the present example is in the form of a pin. The bracing surface 208 can, however, also engage in a form-fitting manner behind a different part of the bracing means 40. In the present example, the projection 210 in pin form protrudes laterally from the bracing means 40. Such projections 210 and bracing surfaces 208 are present on both sides of the bracing means 40.

The attachment 14 can generally also have a tire displacement device 206, as is shown in FIG. 24. This serves to lift the tire 3 from the rim flange 10 in order to facilitate engagement of the bracing means 40 behind it.

The bracing means locking device 204 shown here is so configured and arranged relative to the bracing means 40 that the bracing means locking device 204, when it is moved into the securing position SP (this movement is illustrated in FIG. 24a by the arrow 212), additionally braces the hook portion 42 of the bracing means 40, which is in engagement behind the portion 10, 11 of the rim 2a, against the portion 10, 11 of the rim 2a. This is effected in the present example in that the bracing surfaces 208 are configured to be beveled and are arranged in such a manner that, when the bracing means locking device 204, or the bracing surfaces 208 thereof, move or moves radially inwards, it/they brace/ braces the bracing means 40 further into the engagement position via the projections 210.

The movement of the bracing means locking device 204, or of the bracing surfaces 208 thereof, can be produced via an actuating portion 214. Wherein the actuating portion 214 can be coupled with the bracing means locking device 204 in such a manner that the bracing means locking device 204 is moved into the securing position SP when the actuating portion 214 is actuated, in particular subjected to pressure.

The actuating portion 214 is preferably arranged in the tread surface 18.

Preferably, the actuating portion 214 has a contact surface 216 which is made of a rubber material or comprises a rubber material. Preferably, the contact surface 216 is arranged in the tread surface 18 and is so configured that, on contact with the road surface, it wears or is abraded in such a manner that it extends flush with the tread surface 18.

The actuating portion 214 is preferably mechanically coupled with the bracing means locking device 204 via a variable portion 220. In particular, the variable portion 220 can be adjustable in its radial extent. This is achieved in the example of FIG. 24a by a variable portion 220 having rib-like projections 221 which can be pushed into a corresponding recess 222 on the bracing means locking device 204.

The functioning of the bracing means locking device 204 is as follows: after or during the engagement of the bracing means 40 behind the rim flange 10, the attachment 14 is turned and the tread surface 18 rolls away over the road surface. The actuating portion 214 thereby contacts the road surface. The actuating portion 214 is thereby moved radially inwards. The movement of the actuating portion 214 is transmitted by the mechanical coupling with the bracing means locking device 204 to the bracing means locking device 204. The bracing means locking device moves radially inwards. The bracing surfaces 208 thereby engage behind the projections 210 on the bracing means 40. The bracing surfaces 208 thereby displace the projections 210, in the present case in the axial direction A, whereby the bracing means 40 is braced against the rim flange 10 via the projections 210, which are connected to the bracing means 40. The bracing means 40 is thereby locked in a form-fitting manner and, at the same time, in particular the hook portion 42 thereof is braced against the rim flange 10. The bracing means 40 is no longer able to pivot out of its engaged position behind the rim flange 10.

The bracing means locking device 204 can, however, also be movable in various other ways, in particular the bracing means locking device 204 can be movable manually. Preferably, the bracing means locking device 204 latches in the securing position SP. It is also conceivable that the bracing means locking device 204 is biased, in particular spring-biased, into the securing position SP.

Bracing means 40, the bracing mechanism 52 and the bracing means locking device 204 have been described in various forms hereinbefore. These forms relate in particular to the embodiments of the attachment 14 according to the invention described hereinbefore. An independent invention is also an attachment 14 which has a base body with a tread surface 18, wherein the attachment 14 additionally comprises one or more embodiments of the bracing means 40 described hereinbefore, in particular and one or more embodiments of the bracing mechanism 52, preferably and one or more embodiments of the bracing means locking device 204.

The invention claimed is:

1. An attachment for a vehicle wheel for enabling driving operation with reduced tire function, the attachment comprising:
a tread portion having a tread surface, and
an initial mounting portion which, on mounting of the attachment, is arranged radially inside the tread surface, and is adapted to be fastened to the vehicle wheel in the region of a bolt circle of a disc of the vehicle wheel,
wherein the tread portion is fastened in a detachable manner to the initial mounting portion by a fastening device,
and wherein the fastening device is so configured that the tread portion moves in an axial direction towards the disc on fastening to the initial mounting portion,
and wherein the tread portion comprises at least one bracing device having a hook portion configured to engage behind a portion of a rim of the vehicle wheel.

2. The attachment as claimed in claim 1, wherein the initial mounting portion is adapted to be fastened to the vehicle wheel in the region of the bolt circle of the disc by at least one of a form-fitting engagement in the region of the bolt circle of the disc and a connection in the region of the bolt circle of the disc.

3. The attachment as claimed in claim 1, wherein the initial mounting portion is configured to be fastened to the vehicle wheel by at least one of a form-fitting engagement of a grip device and friction-based engagement of the grip device with an opening in the disc, wherein the opening is arranged in the region of the bolt circle, wherein the opening is arranged in the disc spaced apart from holes provided in the disc for receiving wheel bolts, and wherein the opening is a center opening of the disc or is spaced apart from an axis of rotation of the disc.

4. The attachment as claimed in claim 3, wherein the grip device comprises an expandable portion configured to engage behind the opening in the region of the bolt circle.

5. The attachment as claimed in claim 3, wherein the grip device comprises a compressible portion configured to be guided, in a compressed state, through the opening in the region of the bolt circle and to expand from the compressed state into an uncompressed state after being guided through the opening.

6. The attachment as claimed in claim 3, wherein a portion of the grip device is connected to the initial mounting portion in an undetachable manner.

7. The attachment as claimed in claim 1, wherein the initial mounting portion is configured to be fastened by a clamping device to one or more wheel bolts of the vehicle wheel, and wherein the clamping device is configured to one of engage and grasp one of the wheel bolts in a clamping manner or engage and grasp at least two of the wheel bolts jointly in a clamping manner.

8. The attachment as claimed in claim 1, wherein the tread portion is configured to be connected to the initial mounting portion in such a manner that the tread portion is movable in the axial direction relative to the initial mounting portion by an actuating device.

9. The attachment as claimed in claim 1, wherein the tread portion is in multi-part form, and wherein the tread portion comprises at least two peripheral segments which are at least one of detachable from one another and pivotable or displaceable relative to one another.

10. The attachment as claimed in claim 1, wherein the tread portion comprises an inner portion which is unbroken in a peripheral direction and is arranged radially inwards from an outer portion, wherein the outer portion is configured with a gap in the peripheral direction, and wherein the outer portion further comprises an insert portion which, when the attachment is mounted on the vehicle wheel, is received in the gap in such a manner that the outer portion has a closed circular tread surface.

11. The attachment as claimed in claim 10, wherein the attachment comprises a bracing mechanism having a contact portion configured to actuate the at least one bracing device and bring the hook portion into engagement behind the portion of the rim upon actuation of the contact portion.

12. The attachment as claimed in claim 11, wherein the contact portion of the bracing mechanism is configured to be actuated by contact with a road surface when the attachment is attached to the vehicle wheel and the vehicle wheel is turning, and wherein the contact portion is arranged in the tread surface of the attachment, and wherein the contact portion, in a deployed state, extends in the peripheral direction flush with the tread surface of the attachment.

13. The attachment as claimed in claim 11, wherein the contact portion of the bracing mechanism is configured to be actuated by contact with the vehicle wheel or the initial mounting portion when the tread portion is fastened to the initial mounting portion or when, in the state fastened to the initial mounting portion, the tread portion is moved towards the initial mounting portion, wherein the contact portion is arranged on the side of the attachment that faces the disc.

14. The attachment as claimed in claim 1, wherein the hook portion of the at least one bracing device, when seen in the axial direction, is configured to slope radially inwards, wherein the at least one bracing device is so configured that the hook portion moves radially inwards when the at least one bracing device is actuated and the at least one bracing device moves towards the disc, and wherein the at least one bracing device is so configured that the tread portion is urged in the axial direction towards the disc as a result of the movement of the hook portion.

15. The attachment as claimed in claim 1, wherein the attachment comprises a locking device configured to be moved into a securing position and configured, in the securing position, to lock the at least one bracing device in such a manner that the hook portion cannot be moved out of engagement behind the portion of the rim of the vehicle wheel as long as the locking device is in the securing position.

16. The attachment as claimed in claim 15, wherein the locking device is so configured and arranged relative to the at least one bracing device that the locking device, when moved into the securing position, additionally braces the hook portion of the at least one bracing device, which is in engagement behind the portion of the rim, against the portion of the rim.

17. A system comprising:
an attachment as claimed in claim 1, and
the disc of the vehicle wheel,
wherein the disc includes the bolt circle and holes for receiving wheel bolts, and has at least one opening arranged in the disc in the region of the bolt circle, and wherein the at least one opening is spaced apart from the holes provided for receiving wheel bolts.

18. The system as claimed in claim 17, wherein the at least one opening comprises multiple openings,
and wherein mid-points of the openings are at least one of spaced apart from a first circle which extends through mid-points of the holes provided for receiving wheel bolts, and spaced apart from a second circle which forms a smallest circle which circumscribes all the holes provided for receiving wheel bolts.

* * * * *